(12) United States Patent
Mellet et al.

(10) Patent No.: US 9,347,539 B2
(45) Date of Patent: May 24, 2016

(54) CONTINUOUSLY VARIABLE TRANSMISSION WITH CHAIN OUTPUT

(71) Applicant: GM Global Technology Operations LLC, Detroit, MI (US)

(72) Inventors: Edward W. Mellet, Rochester Hills, MI (US); James M. Hart, Belleville, MI (US); Daryl A. Wilton, Macomb, MI (US); Clinton E. Carey, Highland, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/944,910

(22) Filed: Nov. 18, 2015

(65) Prior Publication Data

US 2016/0069443 A1 Mar. 10, 2016

Related U.S. Application Data

(62) Division of application No. 14/321,084, filed on Jul. 1, 2014, now Pat. No. 9,239,103.

(60) Provisional application No. 61/842,630, filed on Jul. 3, 2013.

(51) Int. Cl.
*F16H 37/02* (2006.01)
*F16H 3/66* (2006.01)
*F16H 3/44* (2006.01)

(52) U.S. Cl.
CPC .............. *F16H 37/022* (2013.01); *F16H 3/66* (2013.01); *F16H 3/666* (2013.01); *F16H 2003/442* (2013.01); *F16H 2037/023* (2013.01); *F16H 2200/2007* (2013.01); *F16H 2200/2038* (2013.01)

(58) Field of Classification Search
CPC ........... F16H 37/02; F16H 3/666; F16H 3/66; F16H 2037/023; F16H 2200/2007; F16H 2003/442; F16H 2200/2038; F16H 3/663; F16H 2200/2023; F16H 2200/2005; F16H 2200/0034
See application file for complete search history.

(56) References Cited

U.S. PATENT DOCUMENTS

| 4,346,622 | A | 8/1982 | Pierce |
| 4,833,943 | A * | 5/1989 | Bucksch ................ B60K 17/08 475/205 |
| 5,480,361 | A | 1/1996 | Murakami et al. |
| 5,888,161 | A | 3/1999 | McCarrick et al. |
| 5,890,987 | A | 4/1999 | Lamers |
| 6,106,428 | A | 8/2000 | Koneda et al. |
| 6,816,725 | B1 | 11/2004 | Lemke et al. |
| 7,309,067 | B2 | 12/2007 | Kita |
| 7,347,800 | B2 | 3/2008 | Jackson |
| 7,397,800 | B2 | 7/2008 | Elzur |
| 7,789,795 | B2 | 9/2010 | McKenzie et al. |

(Continued)

FOREIGN PATENT DOCUMENTS

JP 2001246952 A 9/2001

*Primary Examiner* — David J Hlavka

(57) ABSTRACT

A multi-mode continuously variable transmission in a powertrain of a motor vehicle includes a continuously variable unit connected to a planetary gear set arrangement. The planetary gear set arrangement generally includes two planetary gear sets, two brakes, and one clutch and provides multiple modes of ratio selection between the continuously variable unit and a transmission output member. The transmission output member is connected to a chain driven final having only three axes of rotation.

20 Claims, 22 Drawing Sheets

(56) References Cited

U.S. PATENT DOCUMENTS

| | | |
|---|---|---|
| 8,460,137 B2 | 6/2013 | Kajigaya et al. |
| 8,620,539 B2 | 12/2013 | Urata et al. |
| 2006/0128517 A1 | 6/2006 | Tiesler et al. |
| 2006/0247086 A1 | 11/2006 | Watanabe et al. |
| 2010/0222971 A1 | 9/2010 | Takahashi et al. |
| 2010/0227736 A1 | 9/2010 | Takahashi et al. |
| 2010/0228449 A1 | 9/2010 | Takahashi et al. |
| 2010/0228450 A1 | 9/2010 | Takahashi et al. |
| 2011/0015833 A1 | 1/2011 | Urata et al. |
| 2011/0048552 A1 | 3/2011 | Dohi et al. |
| 2012/0244985 A1 | 9/2012 | Oguri |
| 2013/0203542 A1 | 8/2013 | Garcia et al. |
| 2015/0065288 A1 | 3/2015 | Mellet et al. |

* cited by examiner

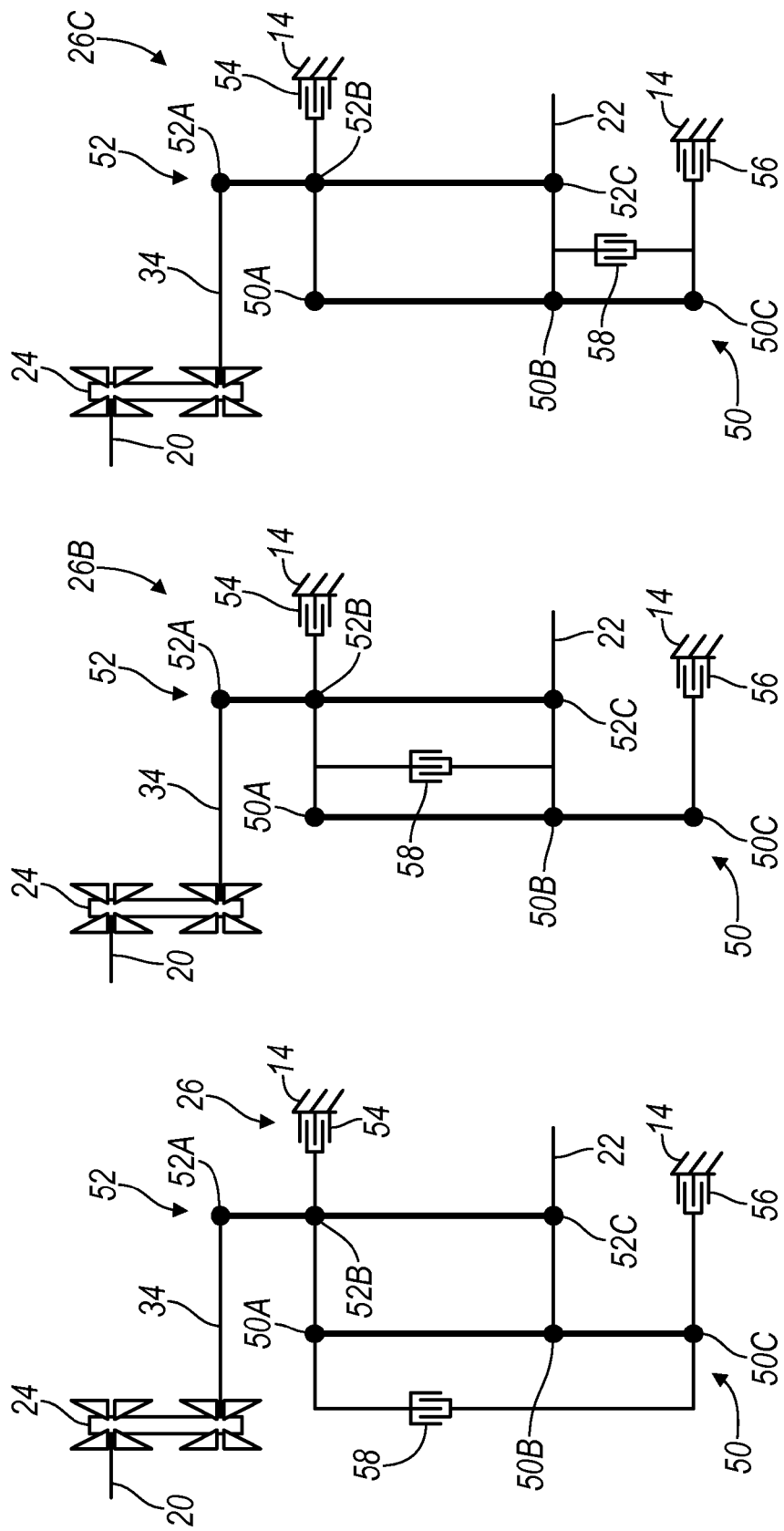

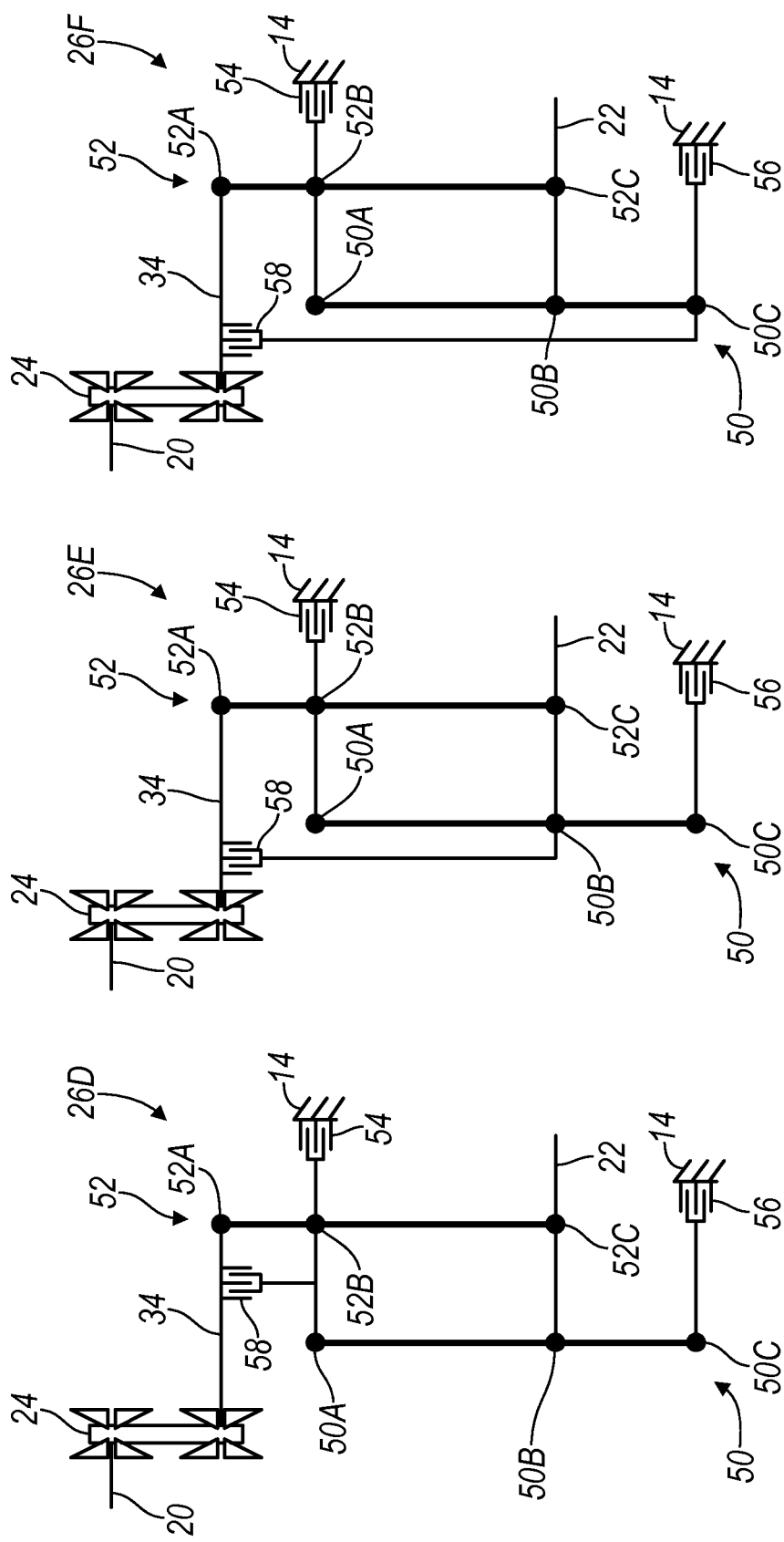

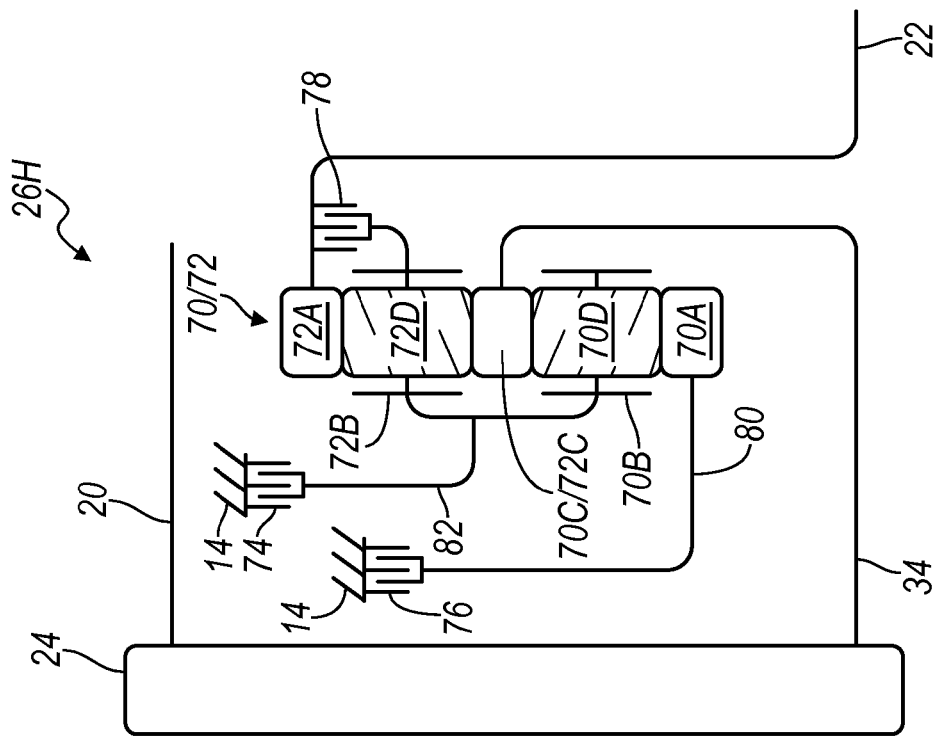
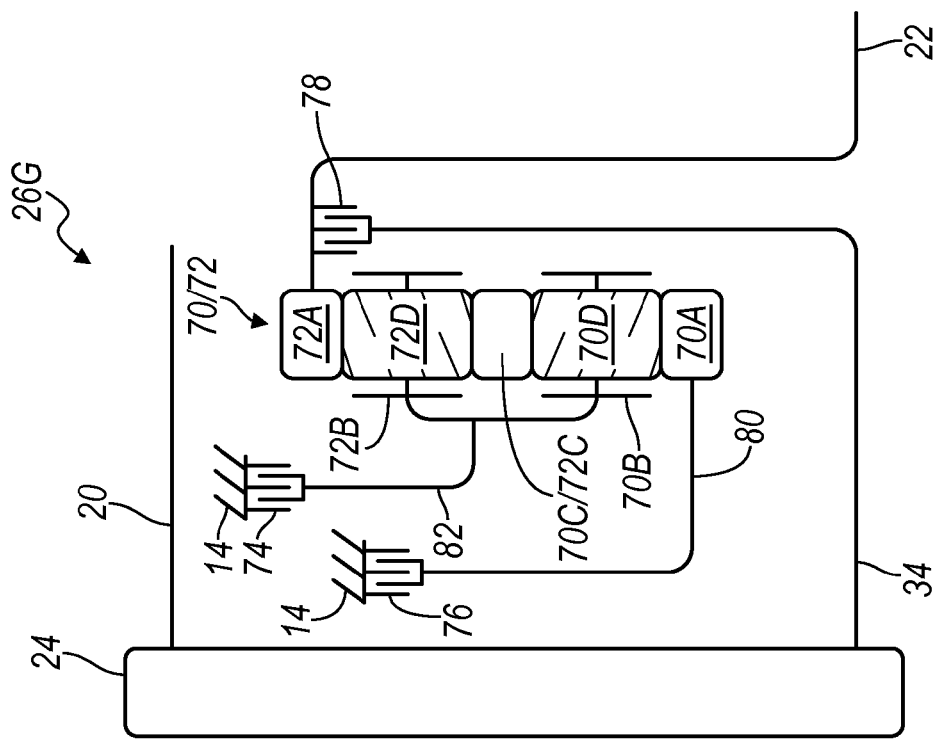
FIG. 7B
FIG. 7A

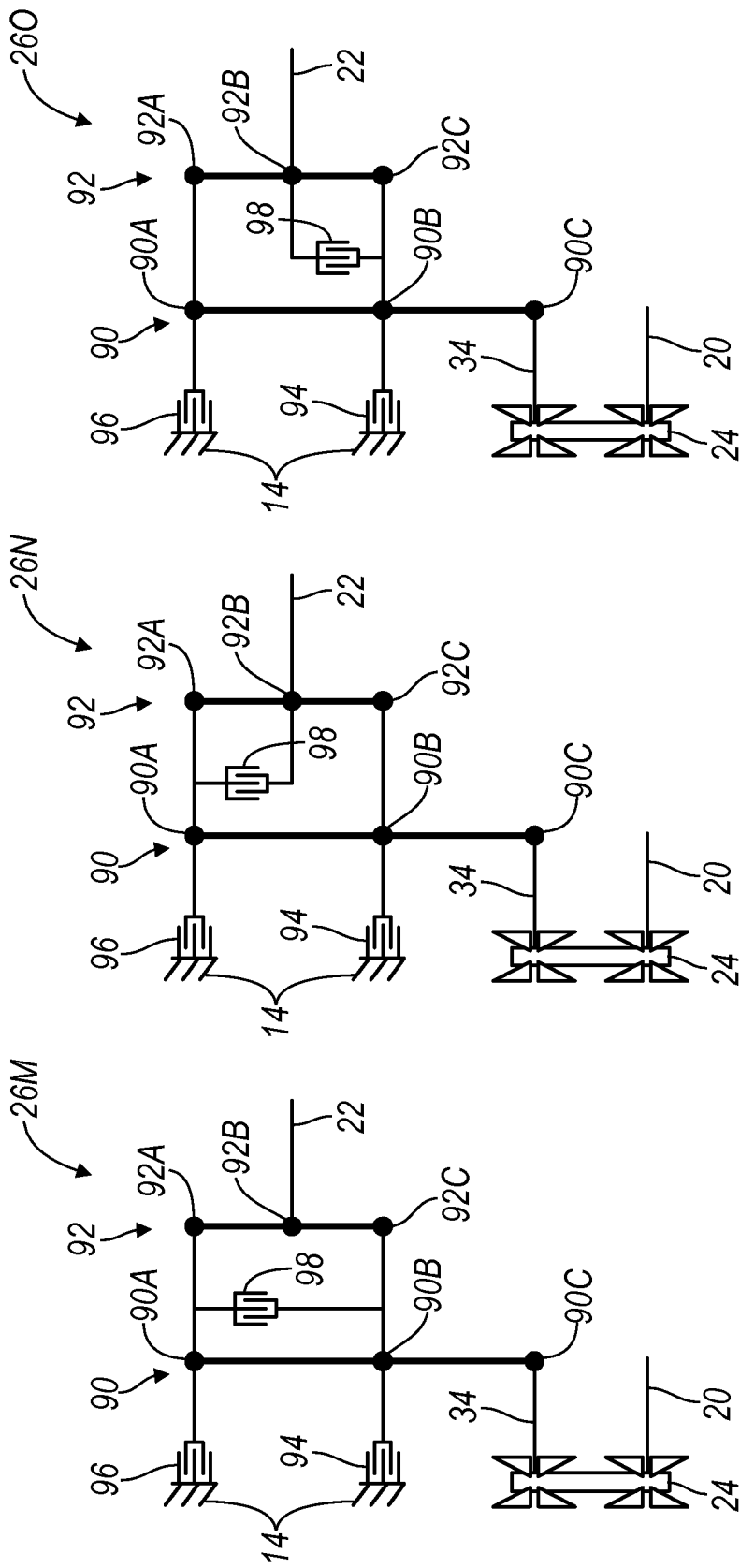

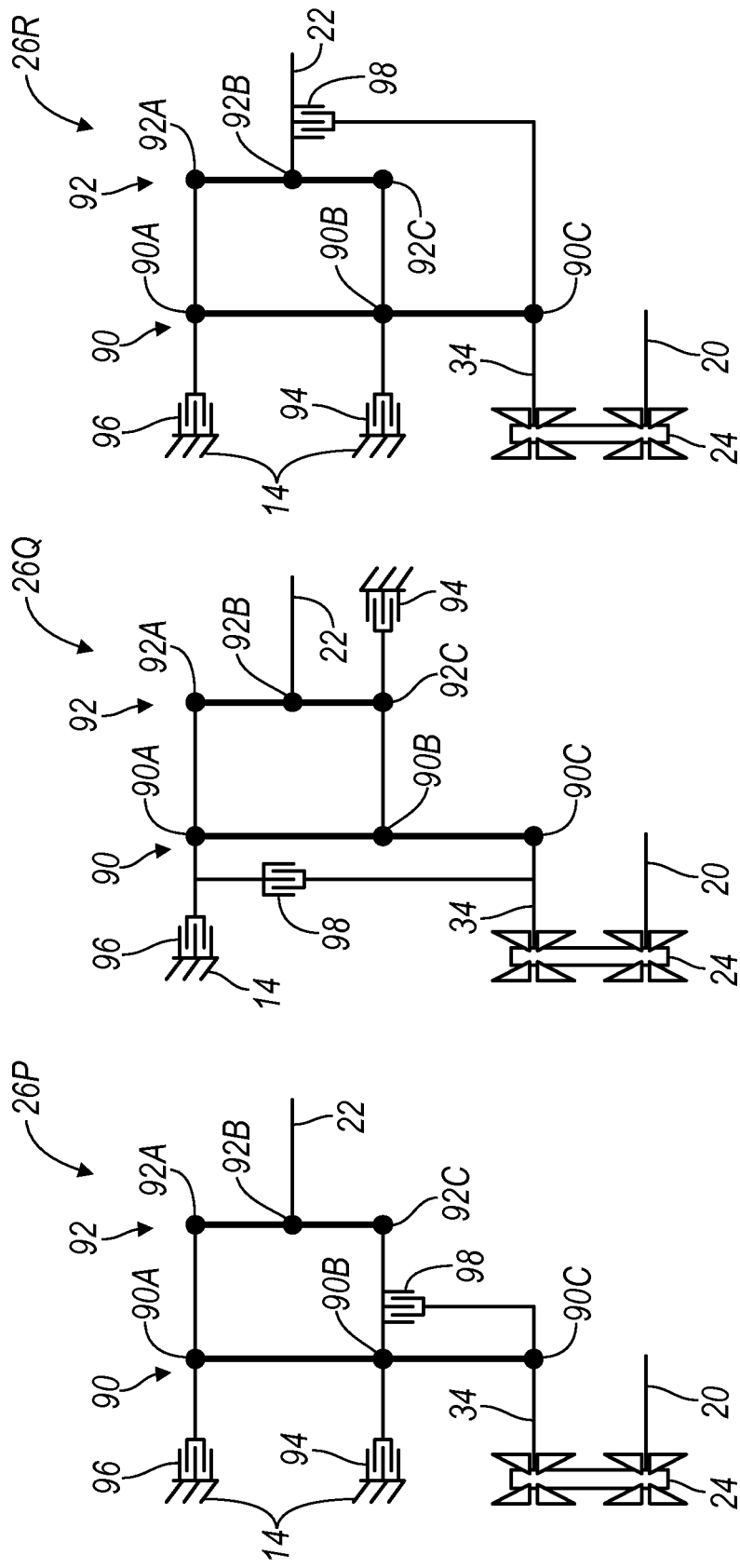

CONTINUOUSLY VARIABLE TRANSMISSION WITH CHAIN OUTPUT

CROSS-REFERENCE TO RELATED APPLICATIONS

This application is a divisional of U.S. Non-Provisional application Ser. No. 14/321,084 filed Jul. 1, 2014 which claims benefit of U.S. Provisional Application No. 61/842,630 filed Jul. 3, 2013. The disclosure of the above applications are incorporated herein by reference.

FIELD

The present disclosure relates to automatic transmissions and more particularly to a continuously variable transmission having a chain output.

BACKGROUND

The statements in this section merely provide background information related to the present disclosure and may or may not constitute prior art.

A continuously variable transmission ("CVT") typically includes a belt and pulley system that operatively couples a rotary power source, such as an engine or electric motor, to a double gear final drive unit. The belt and pulley system generally includes first and second pairs of pulley cones having a torque transmitting belt or chain extending between the cone pairs. Each pulley cone pair includes an axially stationary pulley member and an axially movable pulley member. Each movable pulley member is axially adjustable with respect to the stationary pulley member by a hydraulic system. The hydraulic system provides primary and secondary hydraulic pressures to the respective movable pulley members to adjust the running radius of the first and second pulley cone pairs which in turn controls the output/input ratio of the continuously variable transmission. Movement of the cones steplessly or continuously varies the ratio of an input speed to an output speed. With the continuously variable transmission, small but effective ratio changes can be attained. This is in contrast to a fixed gear ratio unit where any ratio changes are step values.

CVT axial length and mass significantly impact its power density and efficiency. Accordingly, there is a constant need for improved CVT designs that minimize axial length and mass while providing sufficient performance characteristics.

SUMMARY

A powertrain for a motor vehicle is provided. The powertrain includes a continuously variable transmission having a continuously variable unit connected to a planetary gear set arrangement. The planetary gear set arrangement generally includes two planetary gear sets, two brakes, and one clutch and provides multiple modes of ratio selection between the continuously variable unit and a transmission output member. The transmission output member is connected to a chain driven final having only three axes of rotation.

In one aspect of the present invention, a powertrain for a motor vehicle includes a transmission input member, a transmission output member, a continuously variable unit having a first pulley pair connected for common rotation with the transmission input member, a second pulley pair, and an endless member wrapped around the first pulley pair and the second pulley pair, a first planetary gear set having a plurality of members, and a second planetary gear set having a plurality of members, wherein the second planetary gear set is connected for common rotation to the first planetary gear set, the continuously variable unit, and the transmission output member. A clutch selectively connects for common rotation the first planetary gear set to the second planetary gear set. A first brake selectively connects the first planetary gear set to a stationary member. A second brake selectively connects the second planetary gear set to the stationary member. A chain drive is connected for common rotation with the transmission output member. A transfer member is connected for common rotation with the chain drive. A final drive planetary gear set is connected for common rotation with the transfer member. The powertrain includes only three axes of rotation from the transmission output member to the final drive planetary gear set.

In another aspect of the present invention, the first planetary gear set includes a first member, a second member, and a third member and the second planetary gear set includes a first member, a second member, and a third member, wherein the first member of the first planetary gear set is connected for common rotation with the second member of the second planetary gear set, and the second member of the first planetary gear set is connected for common rotation with the third member of the second planetary gear set.

In another aspect of the present invention, the first member of the second planetary gear set is connected for common rotation with the second pulley pair and the second member of the first planetary gear set and the third member of the second planetary gear set are connected for common rotation with the transmission output member.

In another aspect of the present invention, the clutch selectively connects for common rotation the first member of the first planetary gear set and the second member of the second planetary gear set to the second member of the first planetary gear set and the third member of the second planetary gear set.

In another aspect of the present invention, the first brake selectively connects the first member of the first planetary gear set and the second member of the second planetary gear set to the stationary member.

In another aspect of the present invention, the second brake selectively connects the third member of the first planetary gear set to the stationary member.

In another aspect of the present invention, the first member of the first planetary gear set and the second member of the second planetary gear set are integrally formed as a single rotating member.

In another aspect of the present invention, the second member of the first planetary gear set and the third member of the second planetary gear set are integrally formed as a single rotating member.

In another aspect of the present invention, the first member of the first planetary gear set is a ring gear, the second member of the first planetary gear set is a planet carrier member, the third member of the first planetary gear set is a sun gear, the first member of the second planetary gear set is a sun gear, the second member of the second planetary gear set is a ring gear, and the third member of the second planetary gear set is a planet carrier member.

In another aspect of the present invention, the second member of the first planetary gear set and the third member of the second planetary gear set both support a plurality of stepped pinions and a plurality of pinions, wherein each of the plurality of stepped pinions have a first portion in mesh with the third member of the first planetary gear set and a second portion in mesh with the integrally formed first member of the first planetary gear set and the second member of the second planetary gear set and in mesh with the plurality of pinions, and wherein the plurality of pinions are in mesh with the first member of the second planetary gear set.

In another aspect of the present invention, the final drive planetary gear set includes a first member, a second member, and a third member, wherein the first member is connected for common rotation with the transfer member, the second member is interconnected to road wheels of the motor vehicle, and the third member is connected to the stationary member.

In another aspect of the present invention, the first member of the final drive planetary gear set is a sun gear, the second member of the final drive planetary gear set is a planet carrier member, and the third member of the final drive planetary gear set is a ring gear.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and is not intended to limit the scope of the present disclosure in any way.

FIG. 2A is a schematic lever diagram of an exemplary transmission according to the principles of the present invention;

FIG. 2B is a schematic lever diagram of another exemplary transmission according to the principles of the present invention;

FIG. 2C is a schematic lever diagram of another exemplary transmission according to the principles of the present invention;

FIG. 2D is a schematic lever diagram of another exemplary transmission according to the principles of the present invention;

FIG. 2E is a schematic lever diagram of another exemplary transmission according to the principles of the present invention;

FIG. 2F is a schematic lever diagram of another exemplary transmission according to the principles of the present invention;

FIG. 7A is a diagrammatic illustration of an embodiment of a transmission according to the principles of the present invention;

FIG. 7B is a diagrammatic illustration of another embodiment of a transmission according to the principles of the present invention;

FIG. 8A is a schematic lever diagram of an exemplary transmission according to the principles of the present invention;

FIG. 8B is a schematic lever diagram of another exemplary transmission according to the principles of the present invention;

FIG. 8C is a schematic lever diagram of another exemplary transmission according to the principles of the present invention;

FIG. 8D is a schematic lever diagram of another exemplary transmission according to the principles of the present invention;

FIG. 8E is a schematic lever diagram of another exemplary transmission according to the principles of the present invention;

FIG. 8F is a schematic lever diagram of another exemplary transmission according to the principles of the present invention;

DETAILED DESCRIPTION

The following description is merely exemplary in nature and is not intended to limit the present disclosure, application, or uses.

Figure 1:
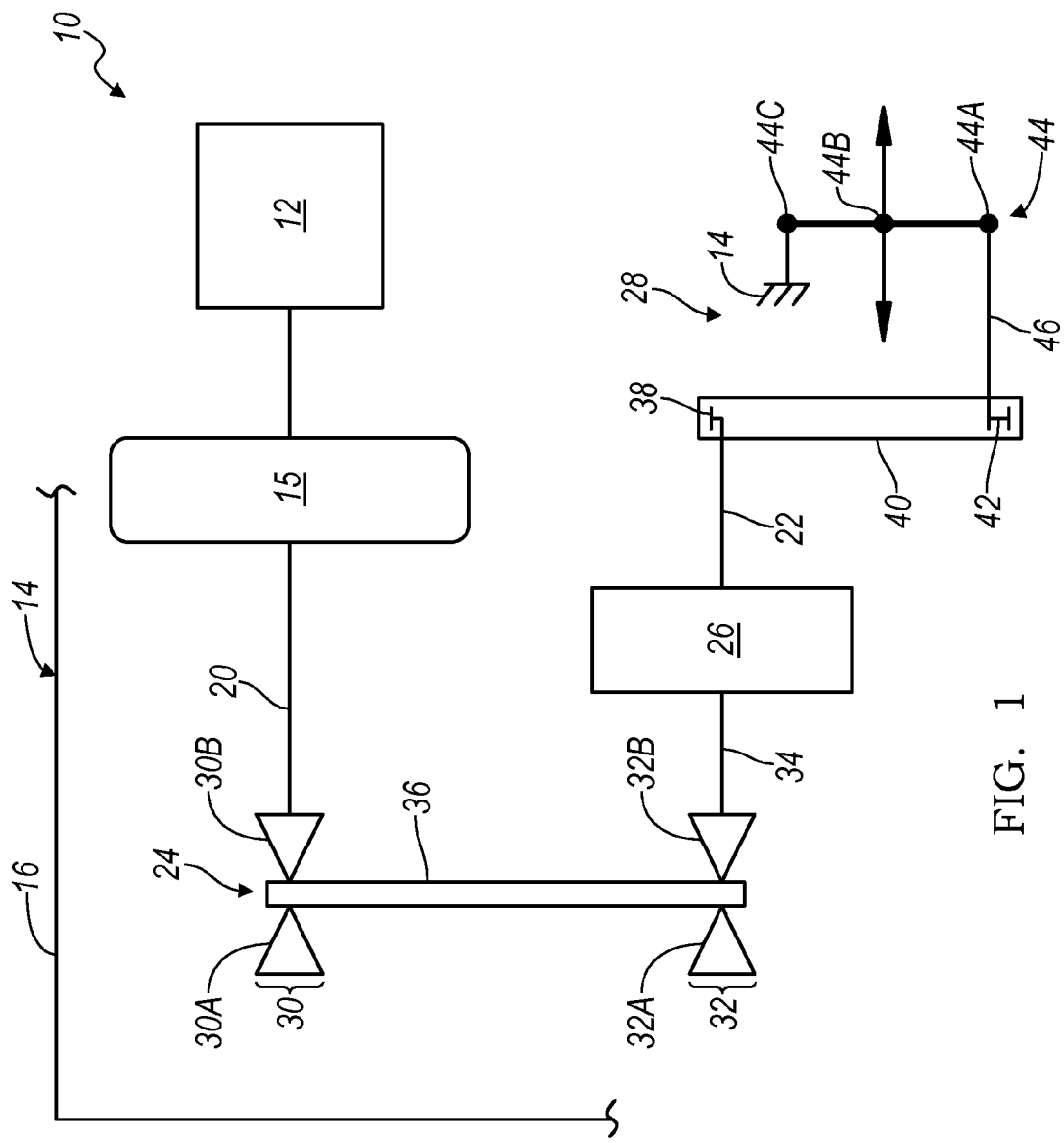
FIG. 1 is a schematic diagram of a powertrain according to the principles of the present invention.

With reference to FIG. 1, a powertrain for a motor vehicle is generally indicated by reference number 10. The powertrain 10 generally includes an engine 12 interconnected with a transmission 14. The engine 12 may be a conventional gasoline, Diesel, or flex fuel internal combustion engine, a hybrid engine, or an electric motor, or any other type of prime mover, without departing from the scope of the present disclosure. The engine 12 supplies a driving torque to the transmission 14 through, for example, a flexplate (not shown) or other connecting device or a starting device 15 such as a hydrodynamic device or launch clutch.

The transmission 14 is a variable diameter pulley or sheave drive continuously variable transmission (CVT). The transmission 14 includes a typically cast, metal housing 16 which encloses and protects the various components of the transmission 14. The housing 16 includes a variety of apertures, passageways, shoulders and flanges which position and support these components. Generally speaking, the transmission 14 includes a transmission input shaft 20 and a transmission output shaft 22. Connected between the transmission input shaft 20 and the transmission output shaft 22 is a pulley assembly 24 and a gearbox 26 that cooperate to provide forward and reverse speed or gear ratios between the transmission input shaft 20 and the transmission output shaft 22. The transmission input shaft 20 is functionally interconnected with the engine 12 through the starting device 15 and receives input torque or power from the engine 12. The transmission output shaft 22 is preferably connected with a chain driven final drive unit 28. The transmission output shaft 22 provides drive torque to the final drive unit 28.

The transmission input shaft 20 is connected to the pulley assembly 24. The pulley assembly 24 includes a first pulley or sheave pair 30 and a second pulley or sheave pair 32. The first pulley 30 includes a first truncated conical sheave or member 30A and second truncated conical sheave or member 30B in axial alignment with the first truncated conical sheave 30A. The second sheave 30B is directly connected for rotation with the transmission input member 20 and may be integrally formed with the transmission input member 20. The first sheave 30A is moveable axially relative to the second sheave 30B by a hydraulic control system (not shown) or other actuating system. It should be appreciated that the sheaves 30A and 30B may be axially switched without departing from the scope of the present invention.

The second pulley 32 includes a first truncated conical sheave or member 32A and second truncated conical sheave or member 32B in axial alignment with the first truncated conical sheave 32A. The second sheave 32B is directly connected for rotation with a transfer shaft or member 34 or may be integrally formed with the transfer shaft 34. The first sheave 32A is moveable axially relative to the second sheave 32B by a hydraulic control system (not shown) or other actuating system. It should be appreciated that the sheaves 32A and 32B may be axially switched without departing from the scope of the present invention.

A torque transmitting belt or chain 36 having a V-shaped cross section is mounted between the first pulley pair 30 and the second pulley pair 32. Drive torque communicated from the transmission input shaft 20 is transferred via friction between the sheaves 30A and 30B and the belt 36. The ratio of the input pulley 30 to the output pulley 32 is adjusted by varying the spacing between the sheaves 30A and 30B and between the sheaves 32A and 32B. For example, to change the ratio between the pulleys 30 and 32, the axial distance between sheaves 30A and 30B may be reduced by moving sheave 30A towards sheave 32B while simultaneously the axial distance between sheave 32A and 32B may be increased by moving sheave 32A away from sheave 32B. Due to the V-shaped cross section of the belt 36, the belt 36 rides higher on the first pulley 30 and lower on the second pulley 32. Therefore the effective diameters of the pulleys 30 and 32 change, which in turn changes the overall gear ratio between the first pulley 30 and the second pulley 32. Since the radial distance between the pulleys 30 and 32 and the length of the belt 36 is constant, the movement of the sheaves 30A and 32A must occur simultaneously in order to maintain the proper amount of tension on the belt 36 to assure torque is transferred from the pulleys 30, 32 to the belt 36.

The pulley assembly 24 transfers torque to the gearbox 26 via the transfer shaft 34. The gearbox 26 comprises one of several planetary gear set transmissions or arrangements, as will be described in greater detail below. The gearbox 26 outputs torque from the pulley assembly 26 to the transmission output shaft 22.

The transmission output shaft 22 is interconnected with or includes a first spur gear or drive sprocket 38. A transfer chain 40 is engaged or otherwise meshed with the drive sprocket 38 and engaged or otherwise meshed with a second spur gear or driven sprocket 42. The driven sprocket 42 is interconnected with a final drive planetary gear set 44 either directly or via a shaft or member 46.

The final drive planetary gear set 44, as well as the various gearbox 26 arrangements described below, are illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

For example, the final drive planetary gear set 44 includes a first node 44A, a second node 44B, and a third node 44C. The first node 44A is coupled to the driven sprocket 42. The third node 44C is connected to a fixed or stationary member such as the transmission housing 14. The second node 44B is a final drive member that may be interconnected to a differential, drive axles, and vehicle road wheels. In a preferred embodiment, the first node 44A corresponds to a sun gear, the second node 44B corresponds to a planet carrier member, and the third node 44C corresponds to a ring gear. Thus, the powertrain 10 only includes three output axes for drive torque: transmission output shaft 22, shaft 46, and the final drive member or planet carrier 44B. By eliminating the conventional four axis arrangement and having only three axes, the powertrain 10 has greater packaging flexibility since elimination of the fourth axis allows greater flexibility and space to package the shaft 46.

Turning now to FIGS. 2A-F, various configurations of the gearbox 26 are shown in lever diagram format. The gearboxes illustrated in FIGS. 2A-F include specific types of transmissions known as Ravigneaux, powerglide, and RC-RC levers, as will be described below. The gearbox or planetary gear arrangement 26 includes a first planetary gear set 50 and a second planetary gear set 52. The first planetary gear set 50 has three nodes: a first node 50A, a second node 50B and a third node 50C. The second planetary gear set 52 has three nodes: a first node 52A, a second node 52B and a third node 52C.

The transfer member 34 is continuously coupled to the first node 52A of the second planetary gear set 52. The transmission output member 22 is coupled to the third node 52C of the second planetary gear set 52. The first node 50A of the first planetary gear set 50 is coupled to the second node 52B of the second planetary gear set 52. The second node 50B of the first planetary gear set 50 is coupled to the third node 52C of the second planetary gear set 52.

A first brake 54 selectively connects the second node 52B of the second planetary gear set 52 and the first node 50A of the first planetary gear set 50 with a stationary element or transmission housing 14. A second brake 56 selectively connects the third node 50C of the first planetary gear set 50 with the stationary element or transmission housing 14. A first clutch 58 selectively connects the first node 50A of the first planetary gear set 50 and the second node 52B of the second planetary gear set 52 with the third node 50C of the first planetary gear set 50.

With reference to FIG. 2B, an alternate gearbox arrangement 26B is shown. The gearbox 26B is similar to that shown in FIG. 2A and therefore like components are indicated by like reference numbers. However, in FIG. 2B, the first clutch 58 is relocated and selectively connects the first node 50A of the first planetary gear set 50 and the second node 52B of the second planetary gear set 52 with the second node 50B of the first planetary gear set 50 and the third node 52C of the second planetary gear set 52.

With reference to FIG. 2C, an alternate gearbox arrangement 26C is shown. The gearbox 26C is similar to that shown in FIG. 2A and therefore like components are indicated by like reference numbers. However, in FIG. 2C, the first clutch 58 is relocated and selectively connects the second node 50B of the first planetary gear set 50 and the third node 52C of the second planetary gear set 52 with the third node 50C of the first planetary gear set 50.

With reference to FIG. 2D, an alternate gearbox arrangement 26D is shown. The gearbox 26D is similar to that shown in FIG. 2A and therefore like components are indicated by like reference numbers. However, in FIG. 2D, the first clutch 58 is relocated and selectively connects the first node 50A of the first planetary gear set 50 and the second node 52B of the second planetary gear set 52 with the first node 52A of the second planetary gear set 52.

With reference to FIG. 2E, an alternate gearbox arrangement 26E is shown. The gearbox 26E is similar to that shown in FIG. 2A and therefore like components are indicated by like reference numbers. However, in FIG. 2E, the first clutch 58 is relocated and selectively connects the second node 50B of the first planetary gear set 50 and the third node 52C of the second planetary gear set 52 with the first node 52A of the second planetary gear set 52.

With reference to FIG. 2F, an alternate gearbox arrangement 26F is shown. The gearbox 26F is similar to that shown in FIG. 2A and therefore like components are indicated by like reference numbers. However, in FIG. 2F, the first clutch 58 is relocated and selectively connects the first node 52A of the second planetary gear set 52 with the third node 50C of the first planetary gear set 50.

Turning now to FIGS. 3A-F stick diagrams present schematic layouts of embodiments of the gearbox 26, 26B-F according to the present invention. In FIGS. 3A-F the numbering from the lever diagram of FIGS. 2A-F are carried over. The clutches and couplings are correspondingly presented whereas the nodes of the planetary gear sets now appear as components of planetary gear sets such as sun gears, ring gears, planet gears and planet gear carriers.

For example, the gear sets 50 and 52 include a common planet carrier member 50B/52C, a ring gear member 50A, a sun gear member 50C, and a sun gear member 52A. It should be appreciated that ring gear member 52B is optional. The common planet carrier member 50B/52C rotatably supports a set of planet gears 50D (only one of which is shown) and 52D (only one of which is shown). The planet gears 50D are each configured to intermesh with the ring gear member 50A while the planet gears 52D are long pinions that each intermesh with both the planet gears 50D and the sun gear member 52A. The sun gear member 50C is connected for common rotation with a first shaft or interconnecting member 60. The sun gear member 52A is connected for common rotation with the transfer member 34. The planet carrier member 50B/52C is connected for common rotation with the transmission output shaft 22. The ring gear member 50A is connected for common rotation with a second shaft or interconnecting member 62.

Figure 3A:
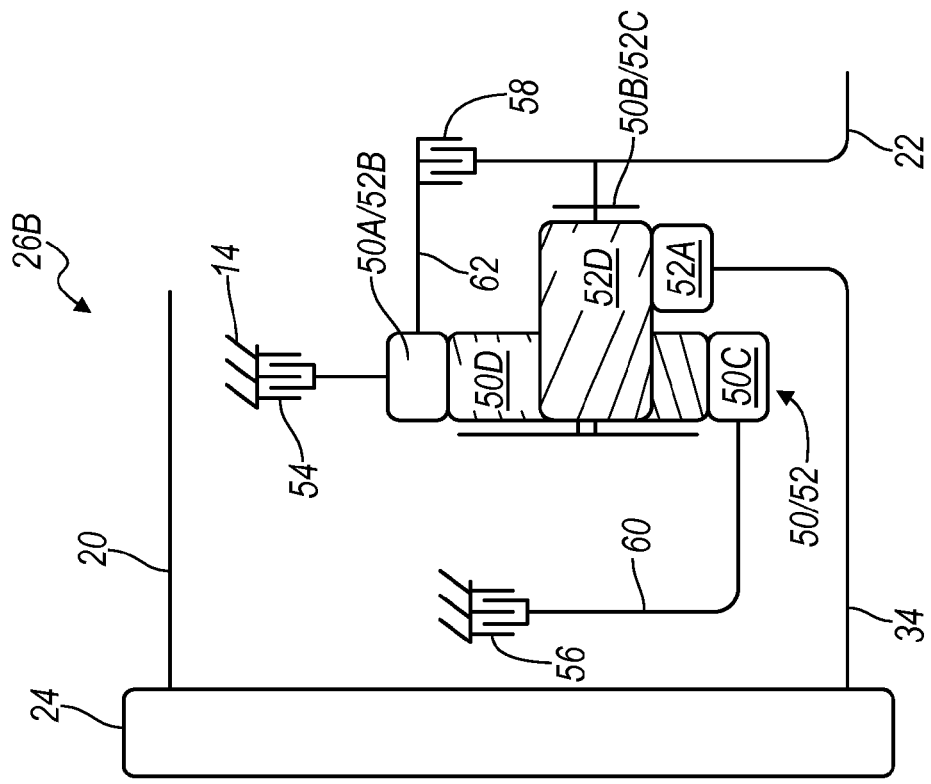
FIG. 3A is a diagrammatic illustration of an embodiment of a transmission according to the principles of the present invention.
Figure 3B:
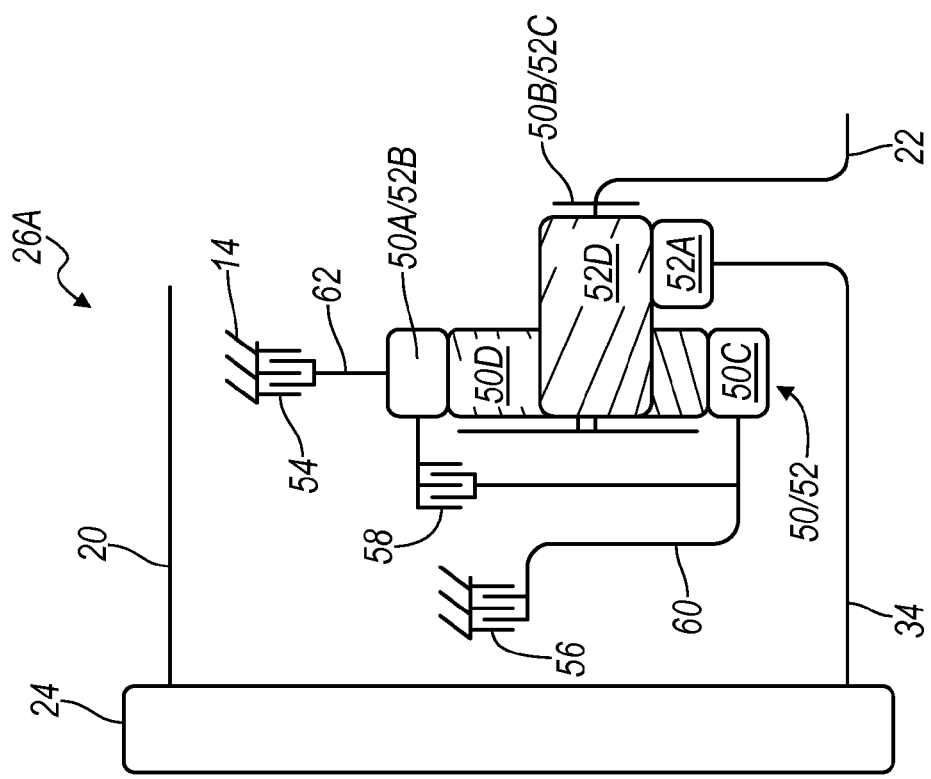
FIG. 3B is a diagrammatic illustration of another embodiment of a transmission according to the principles of the present invention.
Figure 3D:
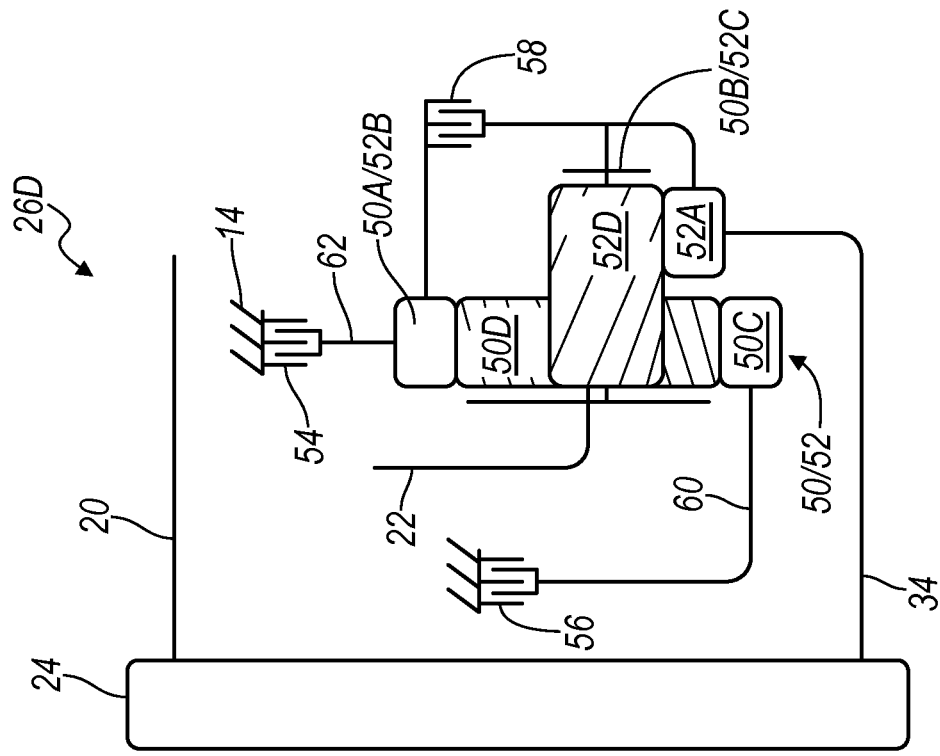
FIG. 3D is a diagrammatic illustration of another embodiment of a transmission according to the principles of the present invention.
Figure 3C:
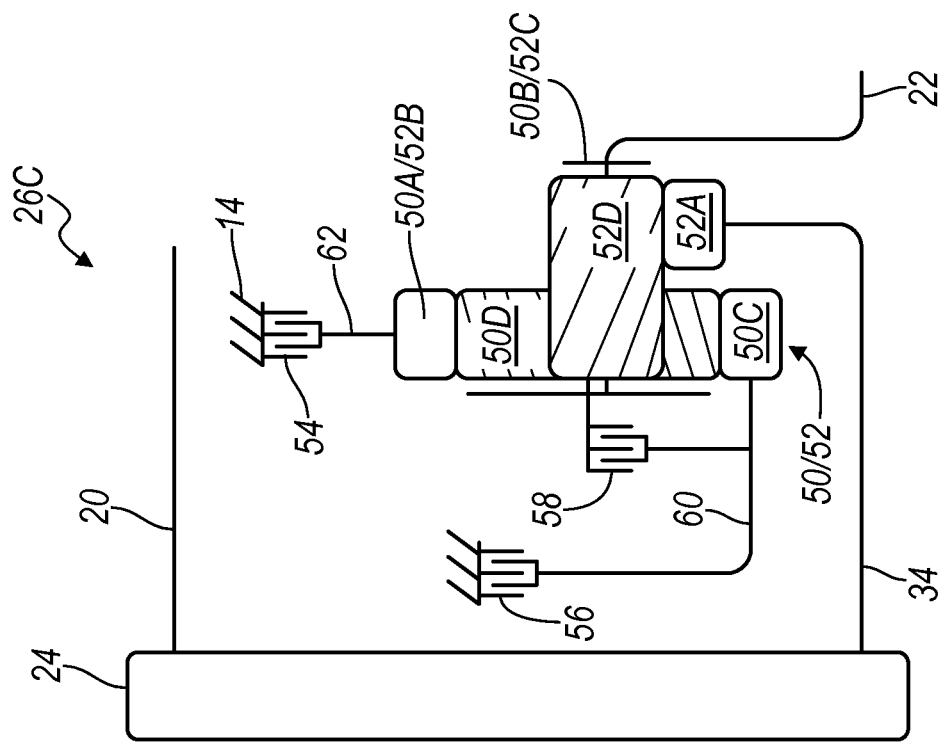
FIG. 3C is a diagrammatic illustration of another embodiment of a transmission according to the principles of the present invention.
Figure 3E:
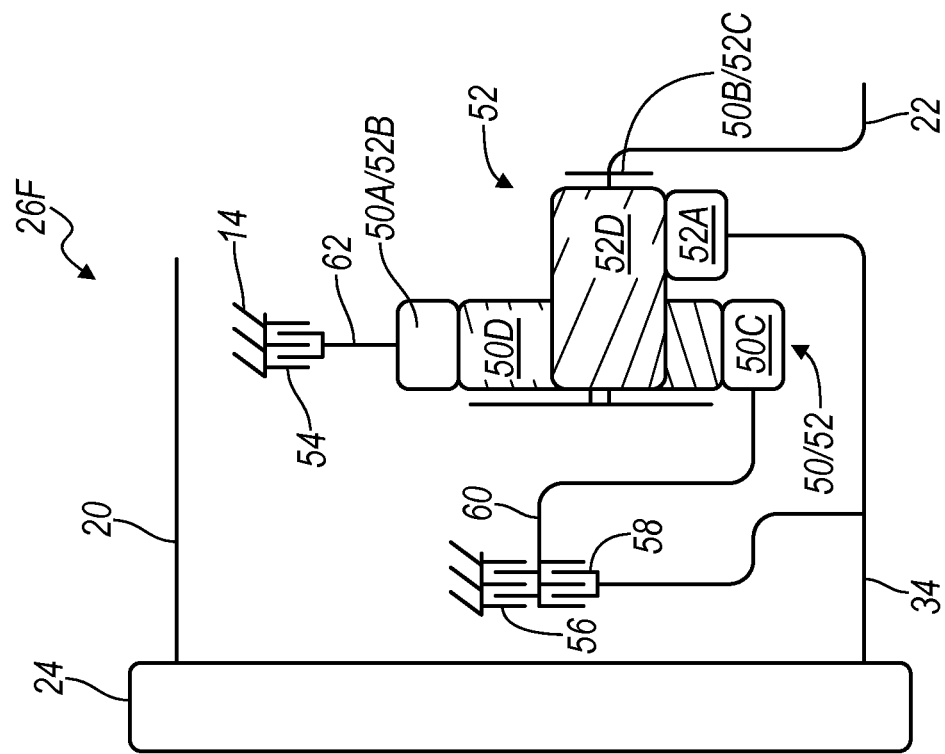
FIG. 3E is a diagrammatic illustration of another embodiment of a transmission according to the principles of the present invention.

The torque-transmitting mechanisms or brakes 54, 56 and clutch 58 allow for selective interconnection of the shafts or interconnecting members, members of the planetary gear sets and the housing. The torque-transmitting mechanisms are friction, dog or synchronizer type mechanisms or the like. For example, the first brake 54 is selectively engageable to connect the second shaft or interconnecting member 62 with the transmission housing 14 in order to restrict relative rotation of the member 62 and therefore the ring gear member 50A. The second brake 56 is selectively engageable to connect the first shaft or interconnecting member 60 with the transmission housing 14 in order to restrict relative rotation of the member 60 and therefore the sun gear member 50C. In FIG. 3A, the clutch 58 is selectively engageable to connect the ring gear member 50A with the sun gear member 50C. Likewise, FIGS. 3B-3F illustrate stick diagrams of the corresponding gearbox arrangements 26B-26F which alter the location of the clutch 58, as described above.

Turning now to FIGS. 4A-F stick diagrams present schematic layouts of Ravigneaux type embodiments of the gearbox 26, 26B-F according to the present invention. In FIGS. 4A-F the numbering from the lever diagram of FIGS. 2A-F are carried over. The clutches and couplings are correspondingly presented whereas the nodes of the planetary gear sets now appear as components of planetary gear sets such as sun gears, ring gears, planet gears and planet gear carriers.

For example, the planetary gear set 50 is configured as a simple planetary gear set while planetary gear set 52 is a compound planetary gear set. The gear sets 50 and 52 include a common planet carrier member 50B/52C, a common ring gear member 50A/52B, a first sun gear member 50C, and a second sun gear member 52A. The common planet carrier member 50B/52C rotatably supports a set of planet gears or stepped pinions 50D (only one of which is shown) and planet gear or non-stepped pinions 52D (only one of which is shown). The planet gears 50D are each configured to intermesh with both the sun gear member 50C and the ring member 50A/52B. The planet gears 50D are stepped pinions having a first stepped portion 51 and a second stepped portion 53. The planet gears 52D each intermesh with both the stepped portions 53 of the planet gears 50D and the sun gear member 52A. The sun gear member 50C is connected for common rotation with a first shaft or interconnecting member 60. The sun gear member 52A is connected for common rotation with the transfer member 34. The planet carrier member 50B/52C is connected for common rotation with the transmission output shaft 22. The ring gear member 50A/52B is connected for common rotation with a second shaft or interconnecting member 62.

Figure 4A:
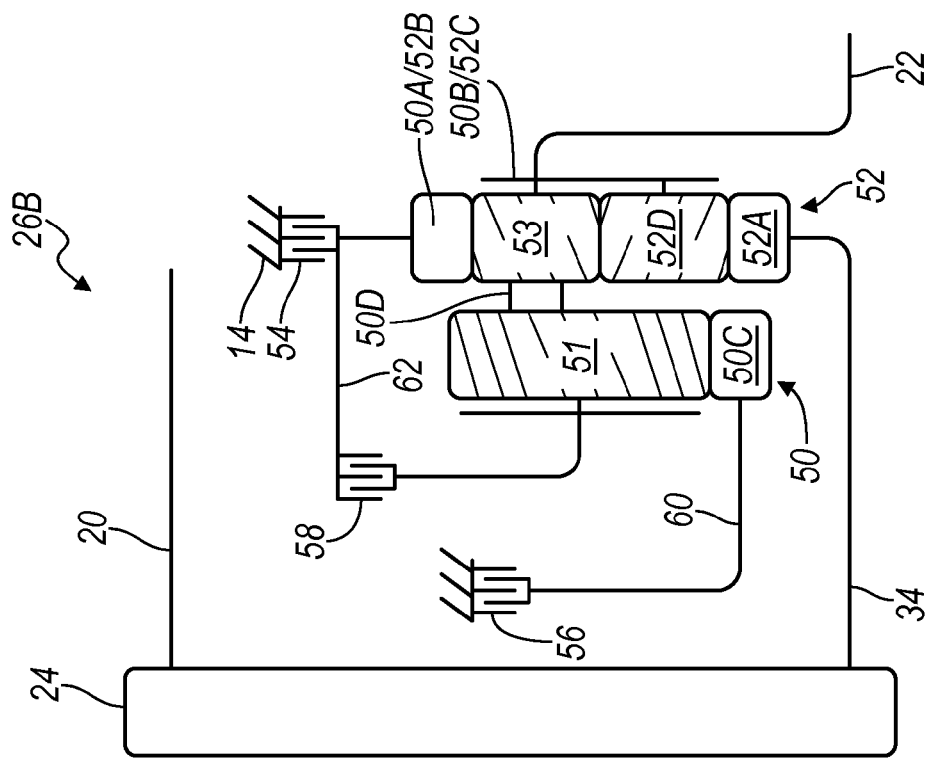
FIG. 4A is a diagrammatic illustration of another embodiment of a transmission according to the principles of the present invention.
Figure 4B:
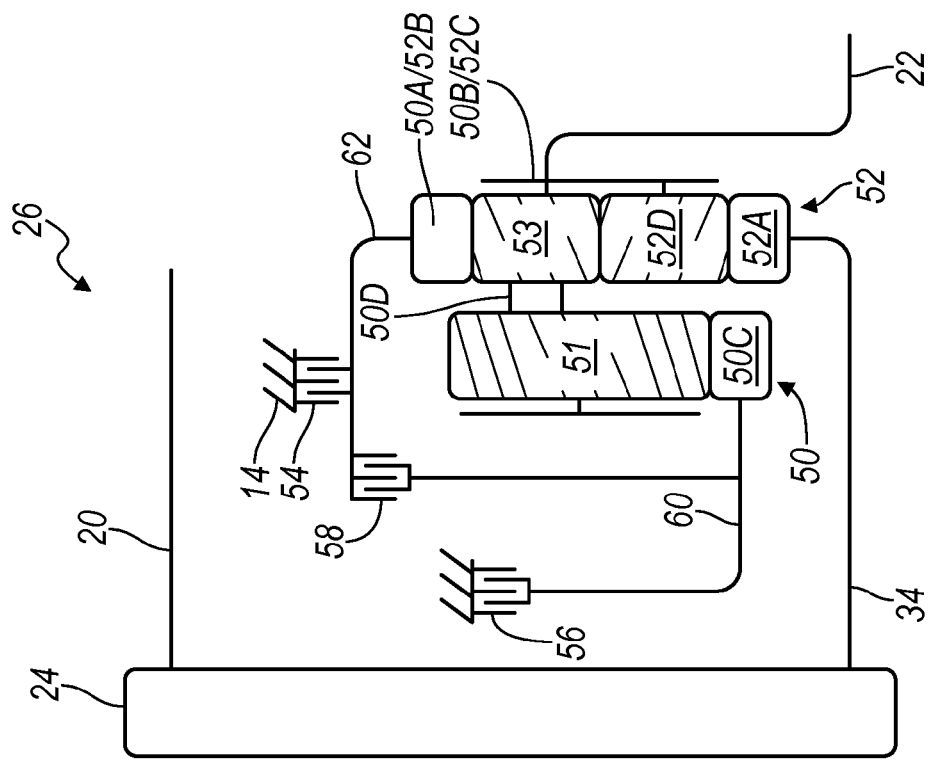
FIG. 4B is a diagrammatic illustration of another embodiment of a transmission according to the principles of the present invention.
Figure 4C:
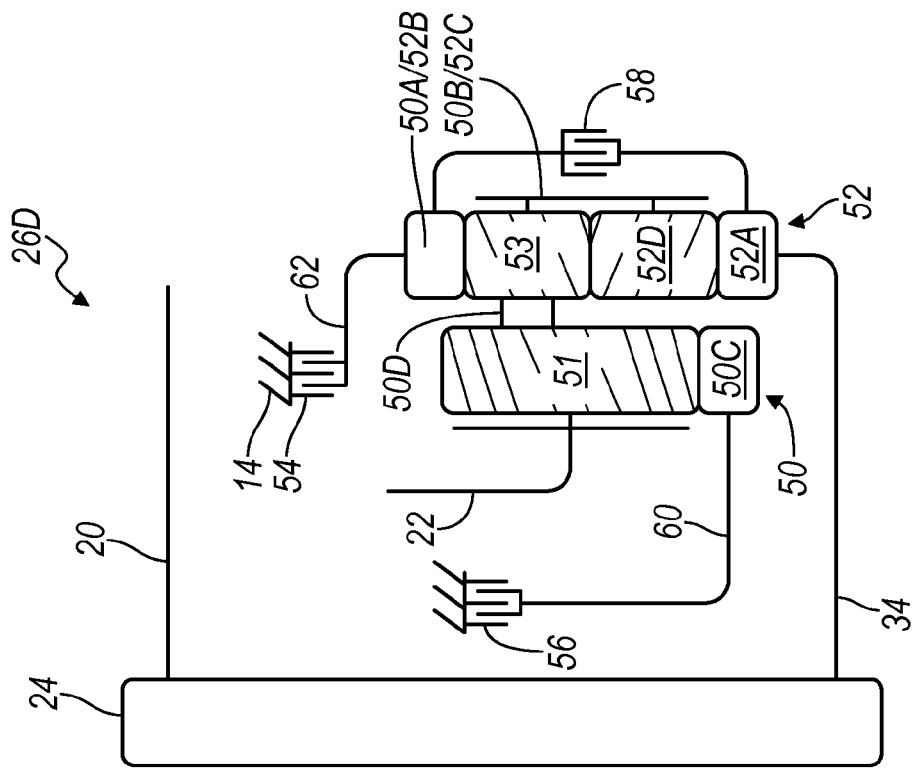
FIG. 4C is a diagrammatic illustration of another embodiment of a transmission according to the principles of the present invention.
Figure 4D:
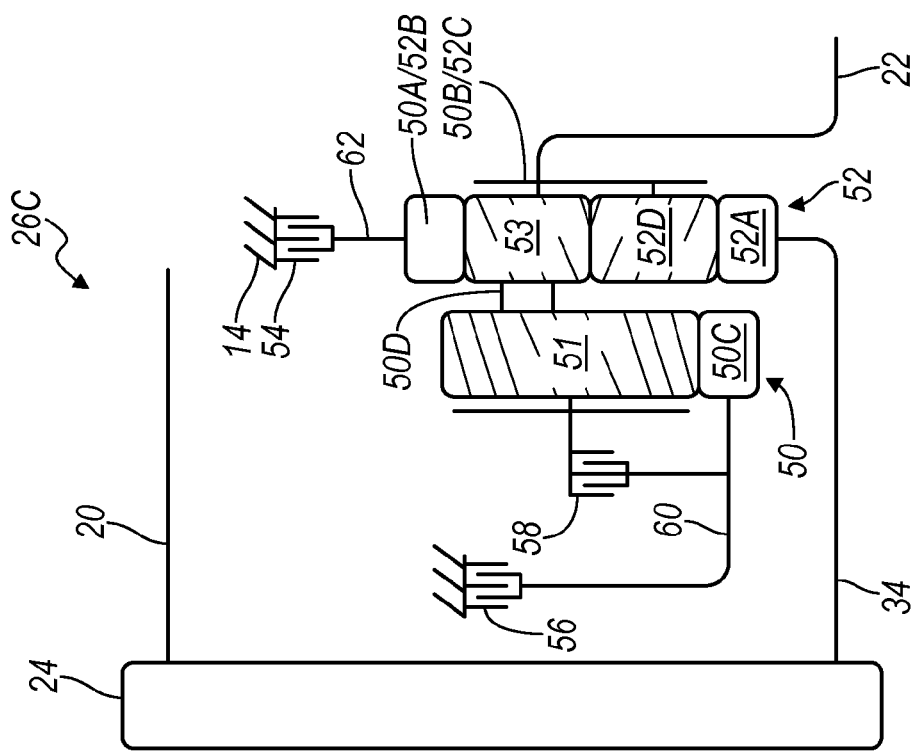
FIG. 4D is a diagrammatic illustration of another embodiment of a transmission according to the principles of the present invention.

The first brake 54 is selectively engageable to connect the second shaft or interconnecting member 62 with the transmission housing 14 in order to restrict relative rotation of the member 62 and therefore the ring gear member 50A/52B. The second brake 56 is selectively engageable to connect the first shaft or interconnecting member 60 with the transmission housing 14 in order to restrict relative rotation of the member 60 and therefore the sun gear member 50C. In FIG. 4A, the clutch 58 is selectively engageable to connect the ring gear member 50A/52B with the sun gear member 50C. Likewise, FIGS. 4B-4F illustrate stick diagrams of the corresponding gearbox arrangements 26B-26F which alter the location of the clutch 58, as described above.

Turning now to FIGS. 5A-F stick diagrams present schematic layouts of embodiments of the gearbox 26, 26B-F according to the present invention. In FIGS. 5A-F the numbering from the lever diagram of FIGS. 2A-F are carried over. The clutches and couplings are correspondingly presented whereas the nodes of the planetary gear sets now appear as components of planetary gear sets such as sun gears, ring gears, planet gears and planet gear carriers.

For example, the planetary gear set 50 includes a sun gear member 50C, a ring gear member 50A, and a planet carrier member 50B that rotatable supports a set of planet gears 50D (only one of which is shown). The planet gears 50D are each configured to intermesh with both the sun gear member 50C and the ring gear member 50A. The sun gear member 50C is connected for common rotation with the first shaft or interconnecting member 60. The ring gear member 50A is connected for common rotation with the second shaft or interconnecting member 62. The planet carrier member 50B is connected for common rotation with the transmission output shaft 22.

The planetary gear set 52 includes a sun gear member 52A, a ring gear member 52C, and a planet carrier member 52B that rotatable supports a set of planet gears 52D (only one of which is shown). The planet gears 52D are each configured to intermesh with both the sun gear member 52A and the ring gear member 52C. The sun gear member 52A is connected for common rotation with the transfer member 34. The ring gear member 52C is connected for common rotation with the transmission output member 22. The planet carrier member 52B is connected for common rotation with the second interconnecting member 62.

Figure 4F:
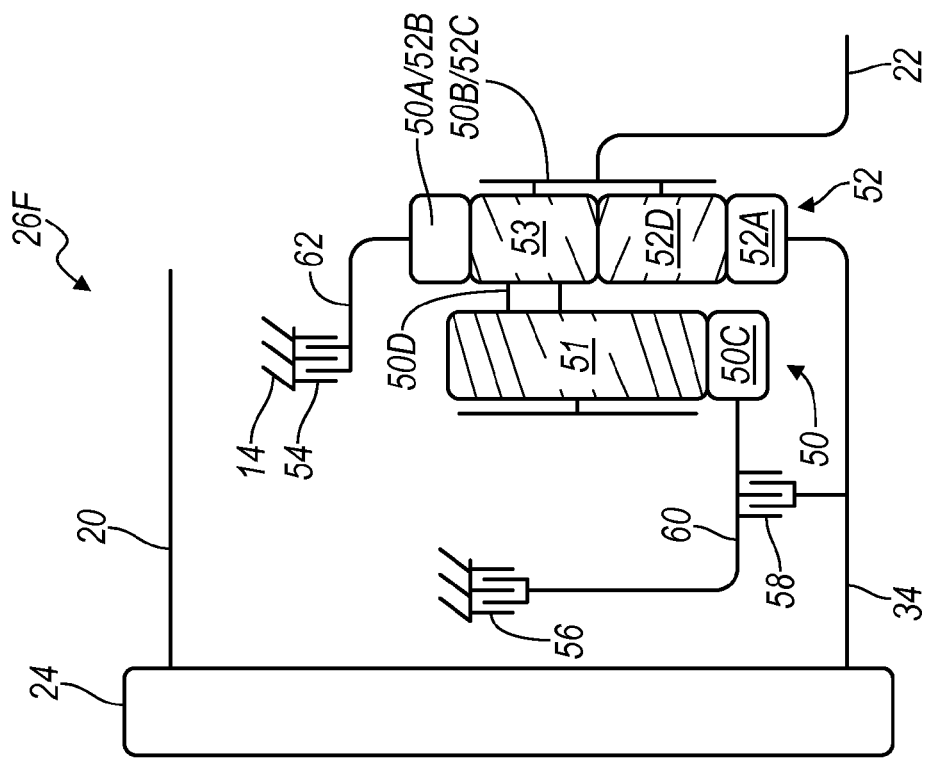
FIG. 4F is a diagrammatic illustration of another embodiment of a transmission according to the principles of the present invention.
Figure 4E:
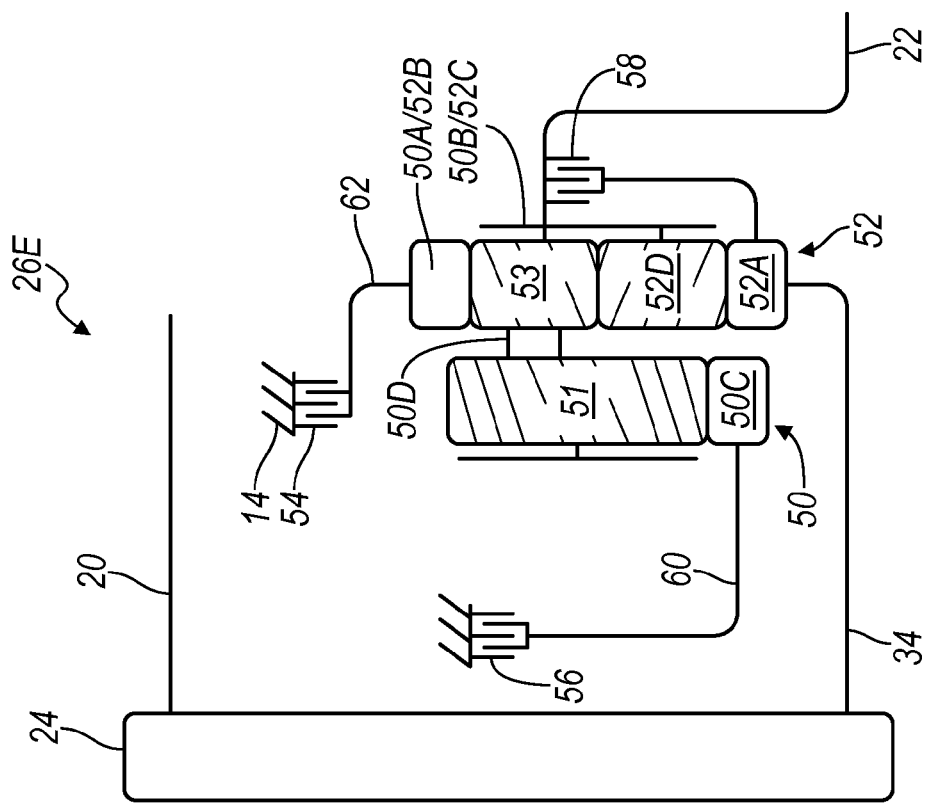
FIG. 4E is a diagrammatic illustration of another embodiment of a transmission according to the principles of the present invention.
Figure 5B:
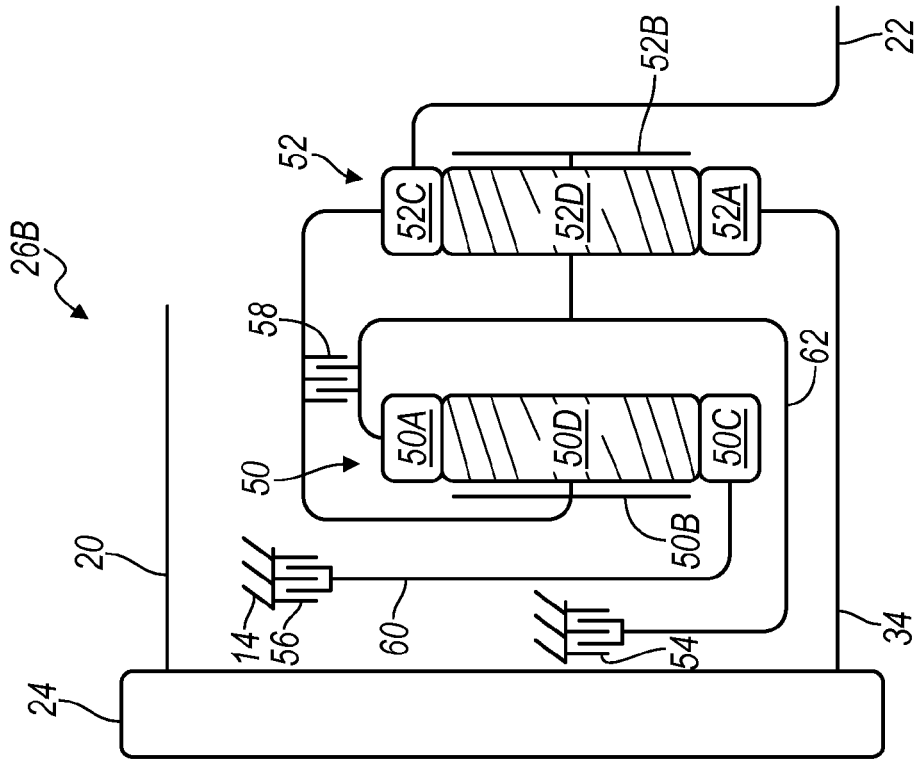
FIG. 5B is a diagrammatic illustration of another embodiment of a transmission according to the principles of the present invention.
Figure 5A:
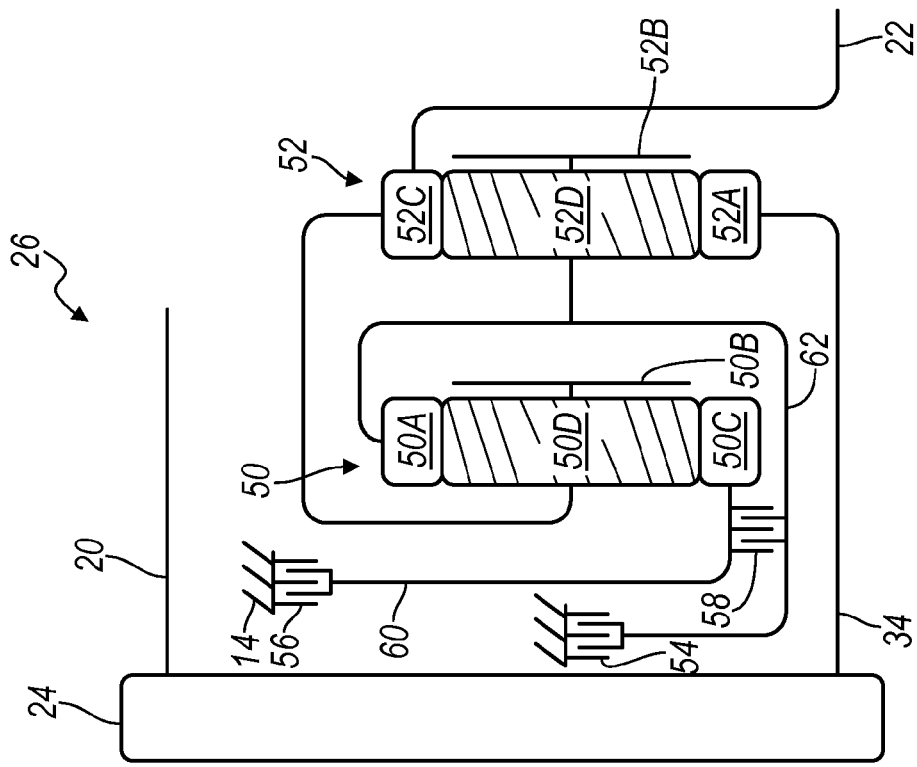
FIG. 5A is a diagrammatic illustration of another embodiment of a transmission according to the principles of the present invention.
Figure 5C:
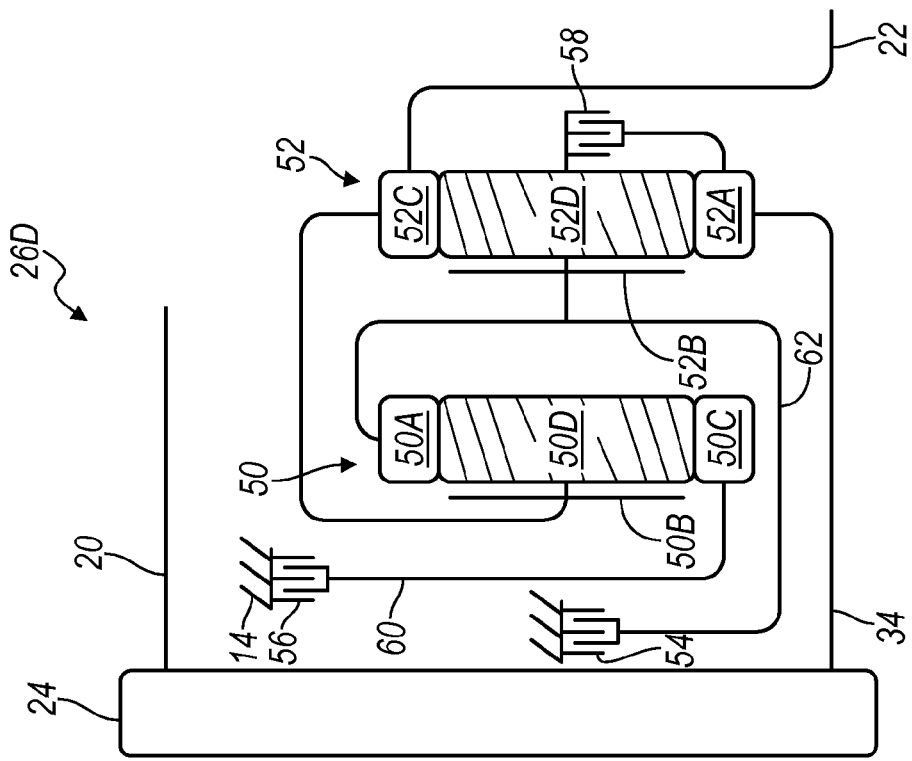
FIG. 5C is a diagrammatic illustration of another embodiment of a transmission according to the principles of the present invention.
Figure 5D:
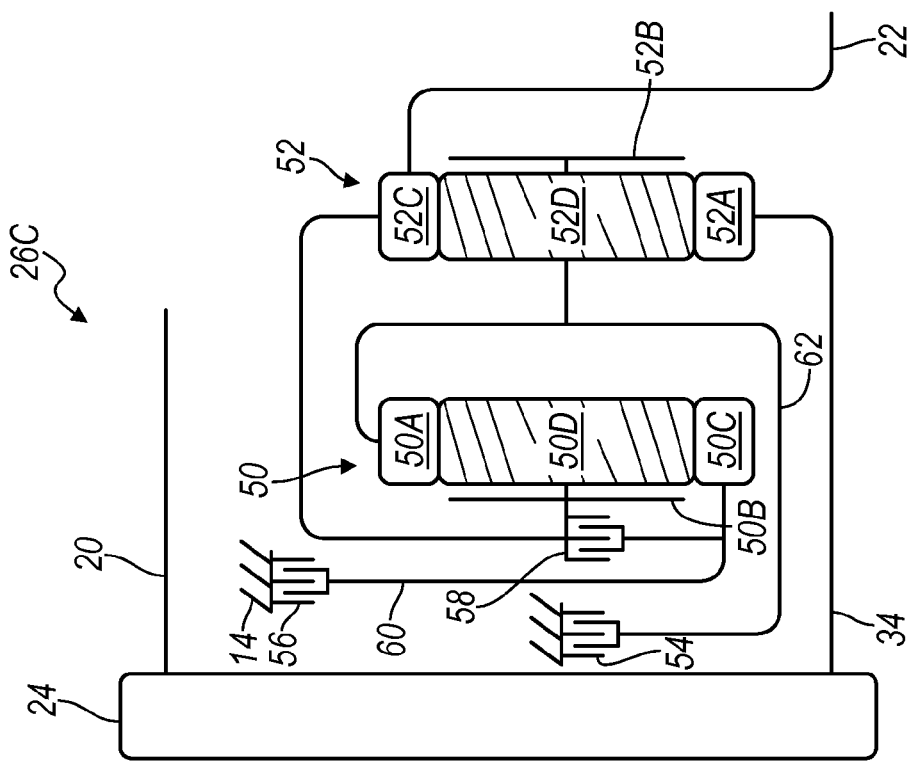
FIG. 5D is a diagrammatic illustration of another embodiment of a transmission according to the principles of the present invention.
Figure 5F:
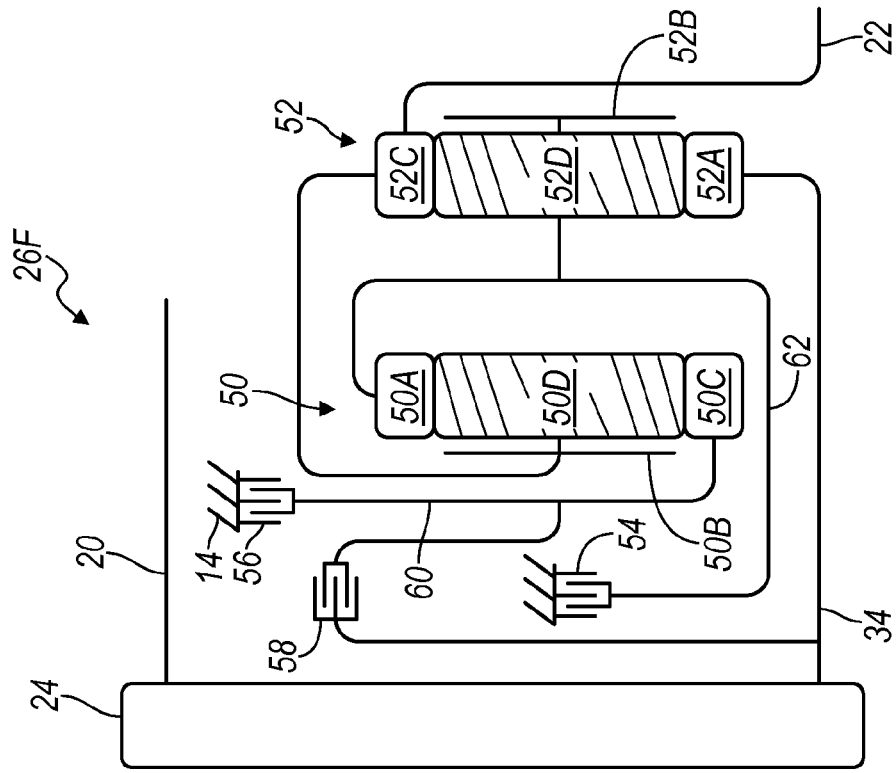
FIG. 5F is a diagrammatic illustration of another embodiment of a transmission according to the principles of the present invention.
Figure 5E:
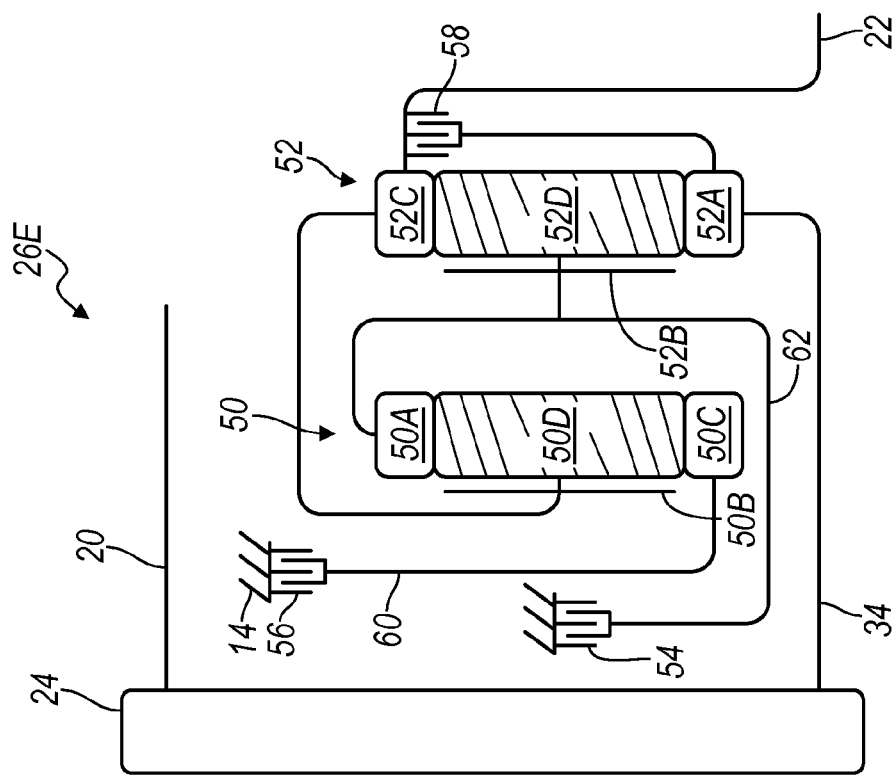
FIG. 5E is a diagrammatic illustration of another embodiment of a transmission according to the principles of the present invention.

The first brake 54 is selectively engageable to connect the second shaft or interconnecting member 62 with the transmission housing 14 in order to restrict relative rotation of the member 62 and therefore the ring gear member 50A and the carrier member 52B. The second brake 56 is selectively engageable to connect the first shaft or interconnecting member 60 with the transmission housing 14 in order to restrict relative rotation of the member 60 and therefore the sun gear member 50C. In FIG. 5A, the clutch 58 is selectively engageable to connect the ring gear member 50A and the carrier member 52B with the sun gear member 50C. Likewise, FIGS. 5B-4F illustrate stick diagrams of the corresponding gearbox arrangements 26B-26F which alter the location of the clutch 58, as described above.

Turning now to FIGS. 6A-F, another set of configurations of the gearbox 26 are shown in lever diagram format. The gearboxes illustrated in FIGS. 6A-F include specific types of transmissions known as stacked planetary gear sets, as will be described below. For example, the gearbox 26G includes a first planetary gear set 70 and a second planetary gear set 72. The first planetary gear set 70 has three nodes: a first node 70A, a second node 70B and a third node 70C. The second planetary gear set 72 has three nodes: a first node 72A, a second node 72B and a third node 72C.

The transfer member 34 is continuously coupled to the third node 70C of the first planetary gear set 70 or to the third node 72C of the second planetary gear set 72. The transmission output member 22 is coupled to the first node 72A of the second planetary gear set 72. The second node 70B of the first planetary gear set 70 is coupled to the second node 72B of the second planetary gear set 72. The third node 70C of the first planetary gear set 70 is coupled to the third node 72C of the second planetary gear set 72.

A first brake 74 selectively connects the second node 70B of the first planetary gear set 70 and the second node 72B of the second planetary gear set 72 with a stationary member or transmission housing 14. A second brake 76 selectively connects the first node 70A of the first planetary gear set 70 with the stationary member or transmission housing 14. A first clutch 78 selectively connects the third node 70C of the first planetary gear set 70 and the third node 72C of the second planetary gear set 72 with the first node 72A of the second planetary gear set 72 and the transmission output member 22.

Figure 6C:
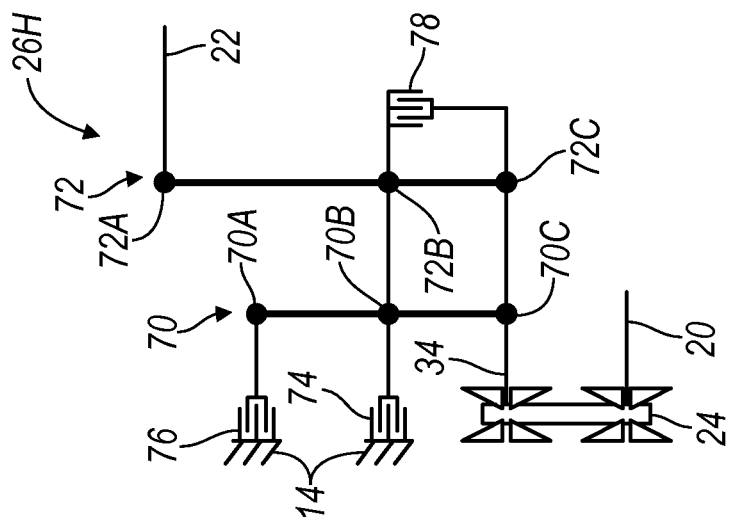
FIG. 6C is a schematic lever diagram of another exemplary transmission according to the principles of the present invention.
Figure 6B:
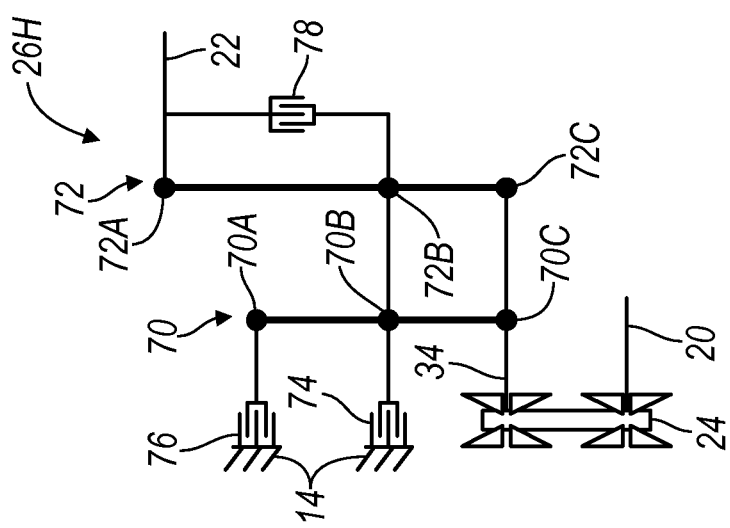
FIG. 6B is a schematic lever diagram of another exemplary transmission according to the principles of the present invention.
Figure 6A:
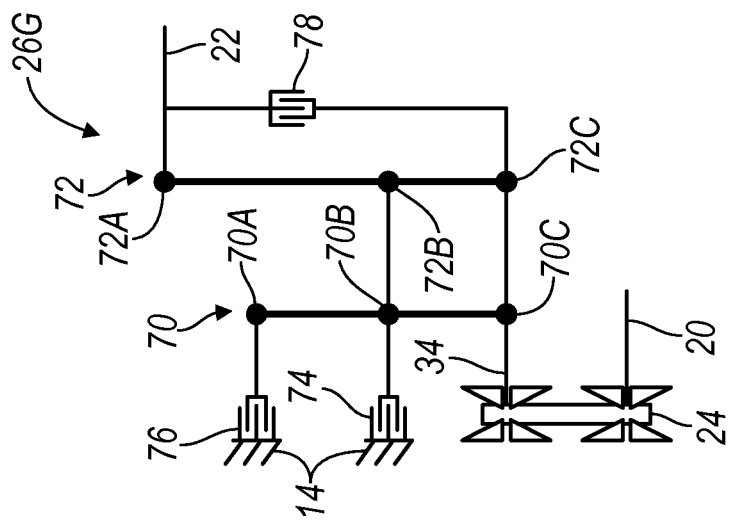
FIG. 6A is a schematic lever diagram of an exemplary transmission according to the principles of the present invention.

With reference to FIG. 6B, an alternate gearbox arrangement 26H is shown. The gearbox 26H is similar to that shown in FIG. 6A and therefore like components are indicated by like reference numbers. However, in FIG. 6B, the first clutch 78 is relocated and selectively connects the second node 70B of the first planetary gear set 70 and the second node 72B of the second planetary gear set 72 with the first node 72A of the second planetary gear set 72 and the transmission output member 22

With reference to FIG. 6C, an alternate gearbox arrangement 26I is shown. The gearbox 26I is similar to that shown in FIG. 6A and therefore like components are indicated by like reference numbers. However, in FIG. 6C, the first clutch 78 is relocated and selectively connects the second node 70B of the first planetary gear set 70 and the second node 72B of the second planetary gear set 72 with the third node 70C of the first planetary gear set 70 and the third node 72C of the second planetary gear set 72.

Figure 6F:
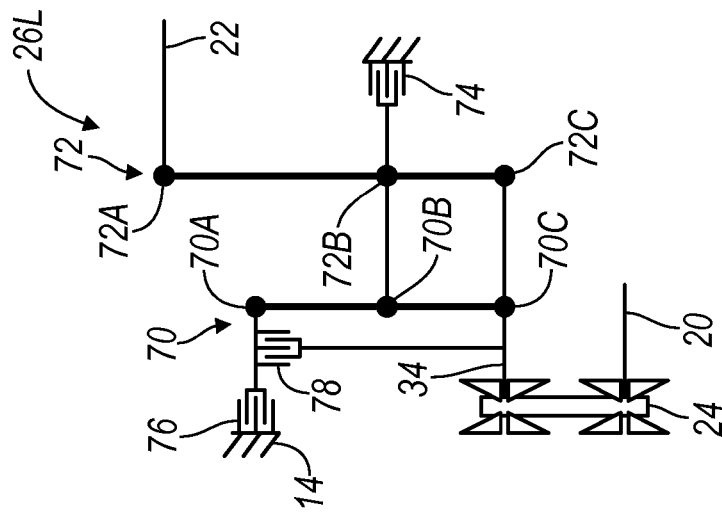
FIG. 6F is a schematic lever diagram of another exemplary transmission according to the principles of the present invention.
Figure 6E:
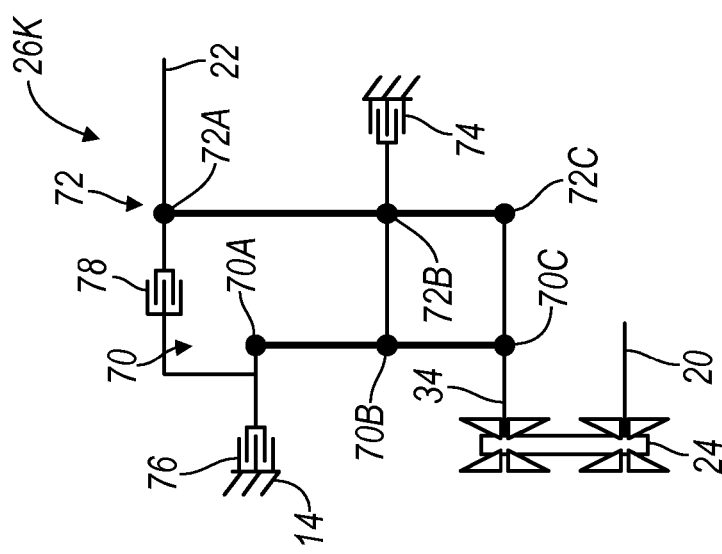
FIG. 6E is a schematic lever diagram of another exemplary transmission according to the principles of the present invention.
Figure 6D:
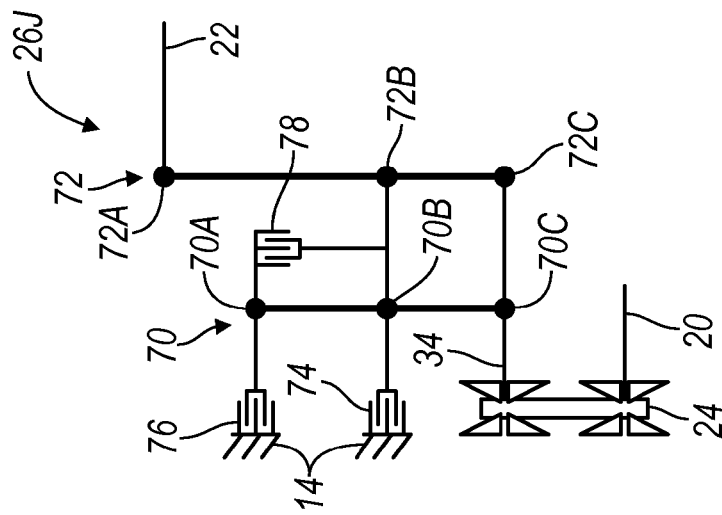
FIG. 6D is a schematic lever diagram of another exemplary transmission according to the principles of the present invention.
Figure 7D:
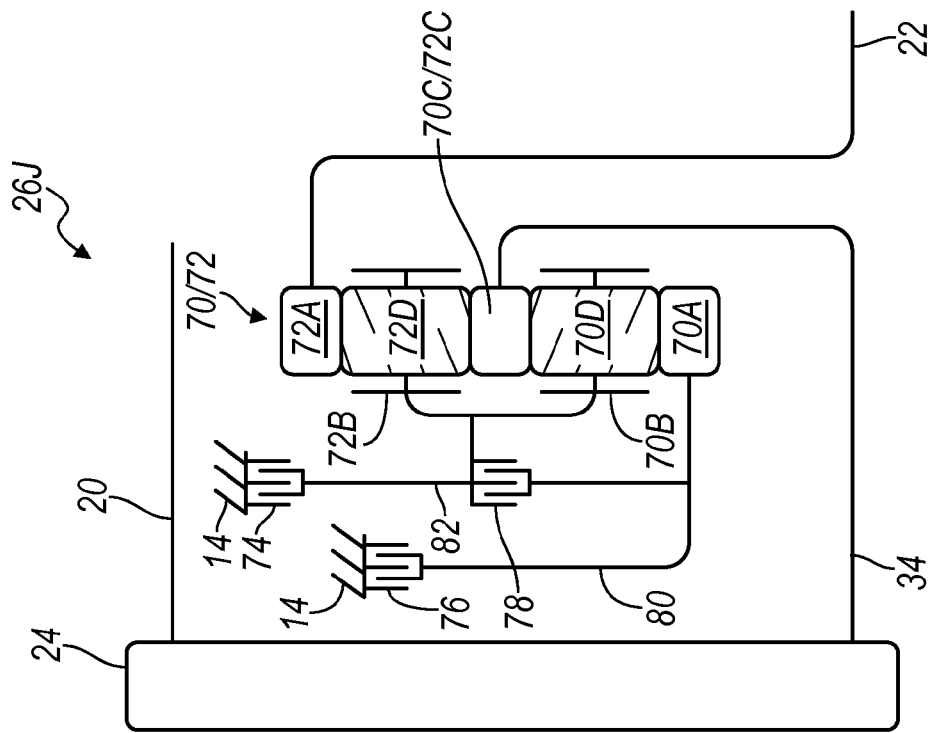
FIG. 7D is a diagrammatic illustration of another embodiment of a transmission according to the principles of the present invention.
Figure 7C:
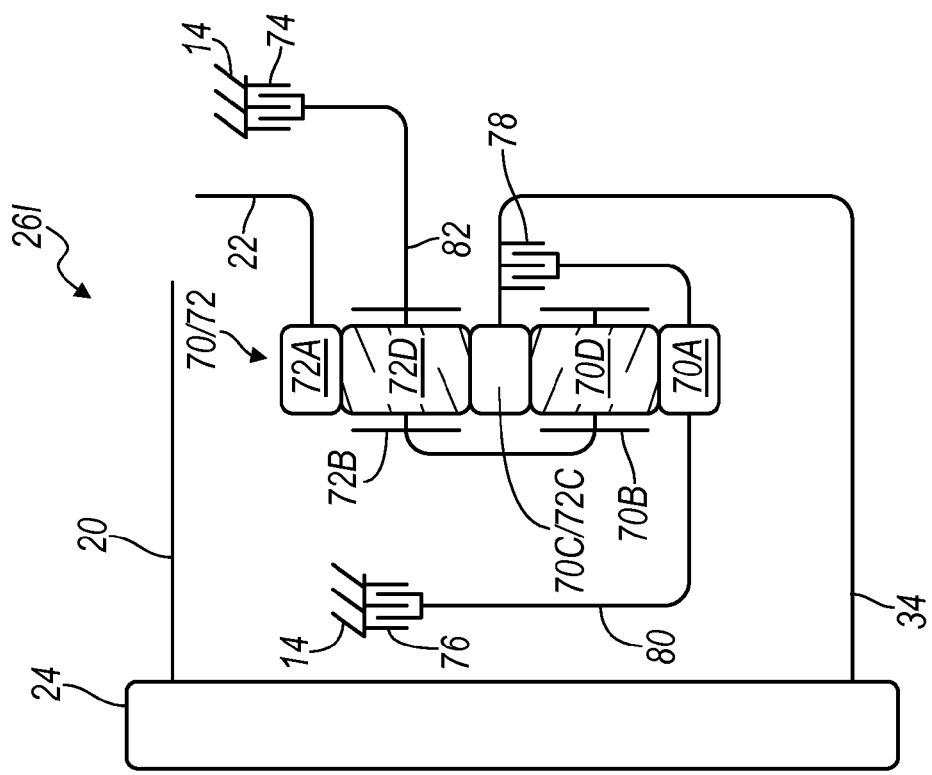
FIG. 7C is a diagrammatic illustration of another embodiment of a transmission according to the principles of the present invention.
Figure 7E:
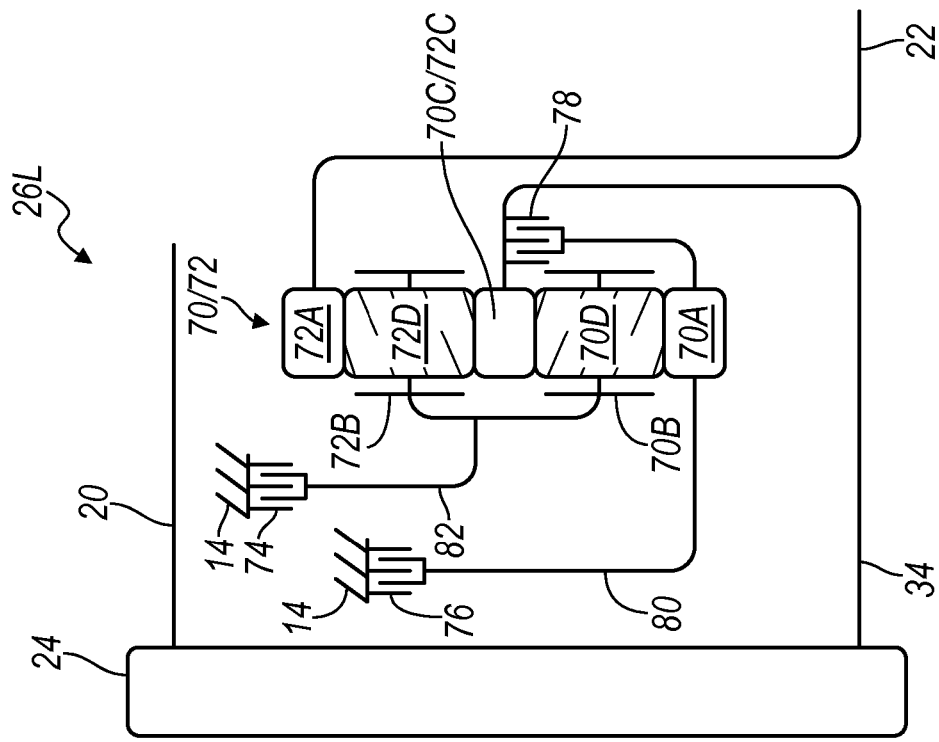
FIG. 7E is a diagrammatic illustration of another embodiment of a transmission according to the principles of the present invention.
Figure 7F:
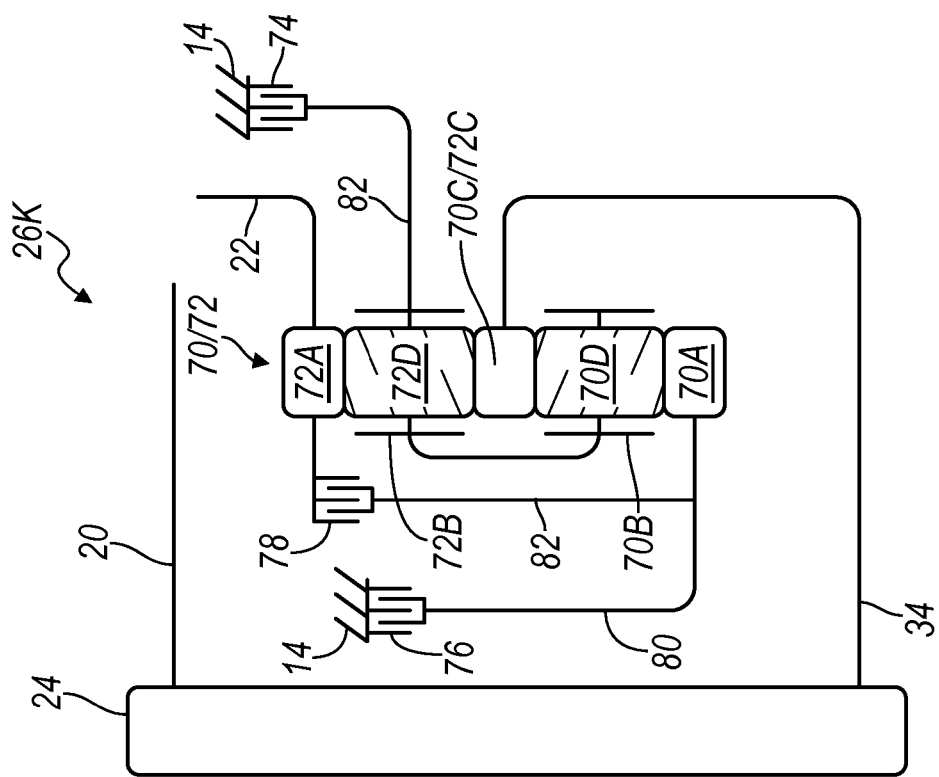
FIG. 7F is a diagrammatic illustration of another embodiment of a transmission according to the principles of the present invention.

With reference to FIG. 6D, an alternate gearbox arrangement 26J is shown. The gearbox 26J is similar to that shown in FIG. 6A and therefore like components are indicated by like reference numbers. However, in FIG. 6D, the first clutch 78 is relocated and selectively connects the second node 70B of the first planetary gear set 70 and the second node 72B of the second planetary gear set 72 with the first node 70A of the first planetary gear set 70.

With reference to FIG. 6E, an alternate gearbox arrangement 26K is shown. The gearbox 26K is similar to that shown in FIG. 6A and therefore like components are indicated by like reference numbers. However, in FIG. 6E, the first clutch 78 is relocated and selectively connects first node 70A of the first planetary gear set 70 with the first node 72A of the second planetary gear set 72.

With reference to FIG. 6F, an alternate gearbox arrangement 26L is shown. The gearbox 26L is similar to that shown in FIG. 6A and therefore like components are indicated by like reference numbers. However, in FIG. 6F, the first clutch 78 is relocated and selectively connects the first node 70A of the first planetary gear set 70 with the third node 70C of the first planetary gear set and the third node 72C of the second planetary gear set 72.

Turning now to FIGS. 7A-F, stick diagrams present schematic layouts of embodiments of the gearbox 26G-L according to the present invention. In FIGS. 7A-F the numbering from the lever diagram of FIGS. 6A-F are carried over. The clutches and couplings are correspondingly presented whereas the nodes of the planetary gear sets now appear as components of planetary gear sets such as sun gears, ring gears, planet gears and planet gear carriers.

For example, the planetary gear set 70 and the planetary gear set 72 are configured as a stacked planetary gear set wherein the first planetary gear set 70 is nested radially inward of the second planetary gear set 72. The planetary gear set 70 includes a sun gear member 70A, a ring gear member 70C, and a planet carrier member 70B that rotatably supports a set of planet gears 70D (only one of which is shown). The planet gears 70D are each configured to intermesh with both the sun gear member 70A and the ring gear member 70C. The sun gear member 70A is connected for common rotation with a first shaft or interconnecting member 80. The ring gear member 70C is connected for common rotation with the transfer member 34. The planet carrier member 70B is connected for common rotation with a second shaft or interconnecting member 82.

The planetary gear set 72 includes a sun gear member 72C, a ring gear member 72A, and a planet carrier member 72B that rotatably supports a set of planet gears 72D (only one of which is shown). The planet gears 72D are each configured to intermesh with both the sun gear member 72C and the ring gear member 72A. The sun gear member 72C is connected for common rotation with the first shaft or interconnecting member 34. The ring gear member 72A is connected for common rotation with the transmission output member 22. The planet carrier member 72B is connected for common rotation with the second shaft or interconnecting member 82. It should be appreciated that the ring gear member 70C of the first planetary gear set 70 and the sun gear member 72C of the second planetary gear set 72 may be formed from a single unitary member having inner and outer gear teeth or from separate gears connected together for rotation.

Figure 3F:
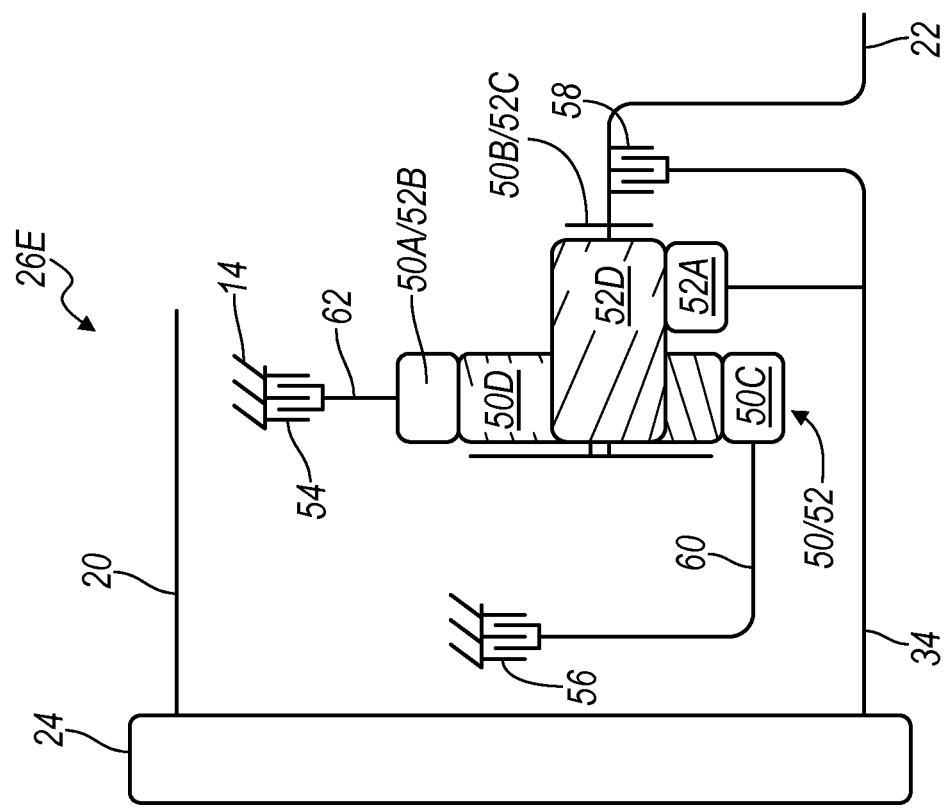
FIG. 3F is a diagrammatic illustration of another embodiment of a transmission according to the principles of the present invention.

The torque-transmitting mechanisms or brakes 74, 76 and clutch 78 allow for selective interconnection of the shafts or interconnecting members, members of the planetary gear sets and the housing. The torque-transmitting mechanisms are friction, dog or synchronizer type mechanisms or the like. For example, the first brake 74 is selectively engageable to connect the second shaft or interconnecting member 82 with the transmission housing 14 in order to restrict relative rotation of the member 82 and therefore the carrier member 70B of the first planetary gear set 70 and the carrier member 72B of the second planetary gear set 72. The second brake 76 is selectively engageable to connect the first shaft or interconnecting member 80 with the transmission housing 14 in order to restrict relative rotation of the member 80 and therefore the sun gear member 70A. In FIG. 7A, the clutch 78 is selectively engageable to connect the ring gear member 72A and the transmission output shaft 22 with the transfer shaft 34 and the ring gear member 70C and sun gear member 72C. Likewise, FIGS. 7B-3F illustrate stick diagrams of the corresponding gearbox arrangements 26H-26L which alter the location of the clutch 78, as described above.

Turning now to FIGS. 8A-F, another set of configurations of the gearbox 26 are shown in lever diagram format. The gearboxes illustrated in FIGS. 8A-F include specific types of transmissions known as Simpson planetary gear sets, as will be described below. For example, the gearbox 26M includes a first planetary gear set 90 and a second planetary gear set 92. The first planetary gear set 90 has three nodes: a first node 90A, a second node 90B and a third node 90C. The second planetary gear set 92 has three nodes: a first node 92A, a second node 92B and a third node 92C.

The transfer member 34 is continuously coupled to the third node 90C of the first planetary gear set 90. The transmission output member 22 is coupled to the second node 92B of the second planetary gear set 92. The first node 90A of the first planetary gear set 90 is coupled to the first node 92A of the second planetary gear set 92. The second node 90B of the first planetary gear set 90 is coupled to the third node 92C of the second planetary gear set 92.

A first brake 94 selectively connects the second node 90B of the first planetary gear set 90 and the third node 92C of the second planetary gear set 92 with a stationary member or transmission housing 14. A second brake 96 selectively connects the first node 90A of the first planetary gear set 90 and the first node 92A of the second planetary gear set with the stationary member or transmission housing 14. A first clutch 98 selectively connects the first node 90A of the first planetary gear set 90 and the first node 92A of the second planetary gear set 92 with the second node 90B of the first planetary gear set 90 and the third node 92C of the second planetary gear set 92.

With reference to FIG. 8B, an alternate gearbox arrangement 26N is shown. The gearbox 26N is similar to that shown in FIG. 8A and therefore like components are indicated by like reference numbers. However, in FIG. 8B, the first clutch 98 is relocated and selectively connects the first node 90A of the first planetary gear set 90 and the first node 92A of the second planetary gear set 92 with the second node 92B of the second planetary gear set 92.

With reference to FIG. 8C, an alternate gearbox arrangement 26O is shown. The gearbox 26O is similar to that shown in FIG. 8A and therefore like components are indicated by like reference numbers. However, in FIG. 8C, the first clutch 98 is relocated and selectively connects the second node 90B of the first planetary gear set 90 and the third node 92C of the second planetary gear set 92 with the second node 92B of the second planetary gear set 92.

With reference to FIG. 8D, an alternate gearbox arrangement 26P is shown. The gearbox 26P is similar to that shown in FIG. 8A and therefore like components are indicated by like reference numbers. However, in FIG. 8D, the first clutch 98 is relocated and selectively connects the second node 90B of the first planetary gear set 90 and the third node 92C of the second planetary gear set 92 with the third node 90C of the first planetary gear set 90.

With reference to FIG. 8E, an alternate gearbox arrangement 26Q is shown. The gearbox 26Q is similar to that shown in FIG. 8A and therefore like components are indicated by like reference numbers. However, in FIG. 8E, the first clutch 98 is relocated and selectively connects the first node 90A of the first planetary gear set 90 and the first node 92A of the second planetary gear set 92 with the third node 90C of the first planetary gear set 90.

With reference to FIG. 8F, an alternate gearbox arrangement 26R is shown. The gearbox 26R is similar to that shown in FIG. 8A and therefore like components are indicated by like reference numbers. However, in FIG. 8F, the first clutch 98 is relocated and selectively connects the third node 90C of the first planetary gear set 90 with the second node 92B of the second planetary gear set 92.

Turning now to FIGS. 9A-F, stick diagrams present schematic layouts of embodiments of the gearbox 26M-R according to the present invention. In FIGS. 9A-F the numbering from the lever diagram of FIGS. 8A-F are carried over. The clutches and couplings are correspondingly presented whereas the nodes of the planetary gear sets now appear as components of planetary gear sets such as sun gears, ring gears, planet gears and planet gear carriers.

For example, the planetary gear set 90 includes a sun gear member 90A, a ring gear member 90C, and a planet carrier member 90B that rotatably supports a set of planet gears 90D (only one of which is shown). The planet gears 90D are each configured to intermesh with both the sun gear member 90A and the ring gear member 90C. The sun gear member 90A is connected for common rotation with a first shaft or interconnecting member 100. The ring gear member 90C is connected for common rotation with the transfer member 34. The planet carrier member 90B is connected for common rotation with a second shaft or interconnecting member 102.

The planetary gear set 92 includes a sun gear member 92A, a ring gear member 92C, and a planet carrier member 92B that rotatably supports a set of planet gears 92D (only one of which is shown). The planet gears 92D are each configured to intermesh with both the sun gear member 92A and the ring gear member 92C. The sun gear member 92A is connected for common rotation with the first shaft or interconnecting member 100. The ring gear member 92C is connected for common rotation with the second shaft or interconnecting member 102. The planet carrier member 92B is connected for common rotation with the transmission output shaft 22.

Figure 9A:
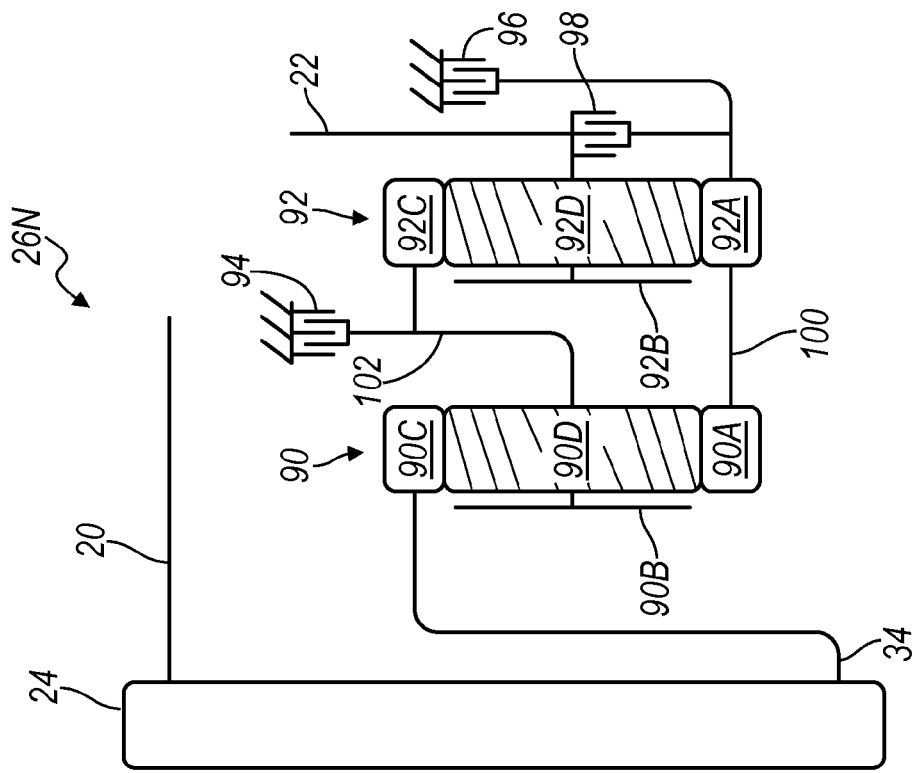
FIG. 9A is a diagrammatic illustration of an embodiment of a transmission according to the principles of the present invention.
Figure 9B:
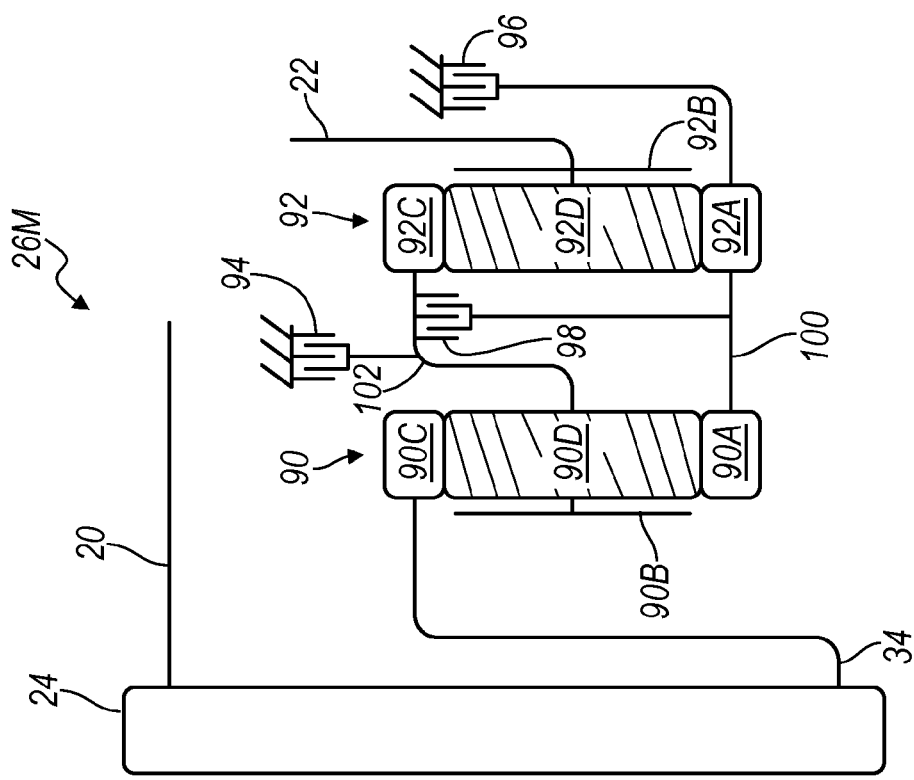
FIG. 9B is a diagrammatic illustration of another embodiment of a transmission according to the principles of the present invention.
Figure 9D:
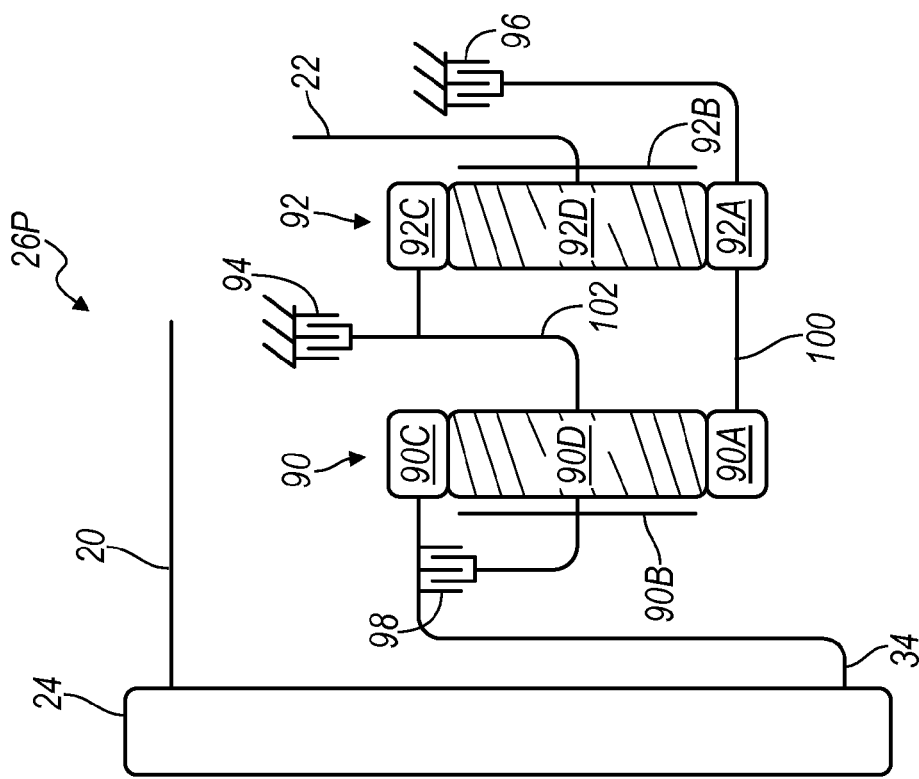
FIG. 9D is a diagrammatic illustration of another embodiment of a transmission according to the principles of the present invention.
Figure 9C:
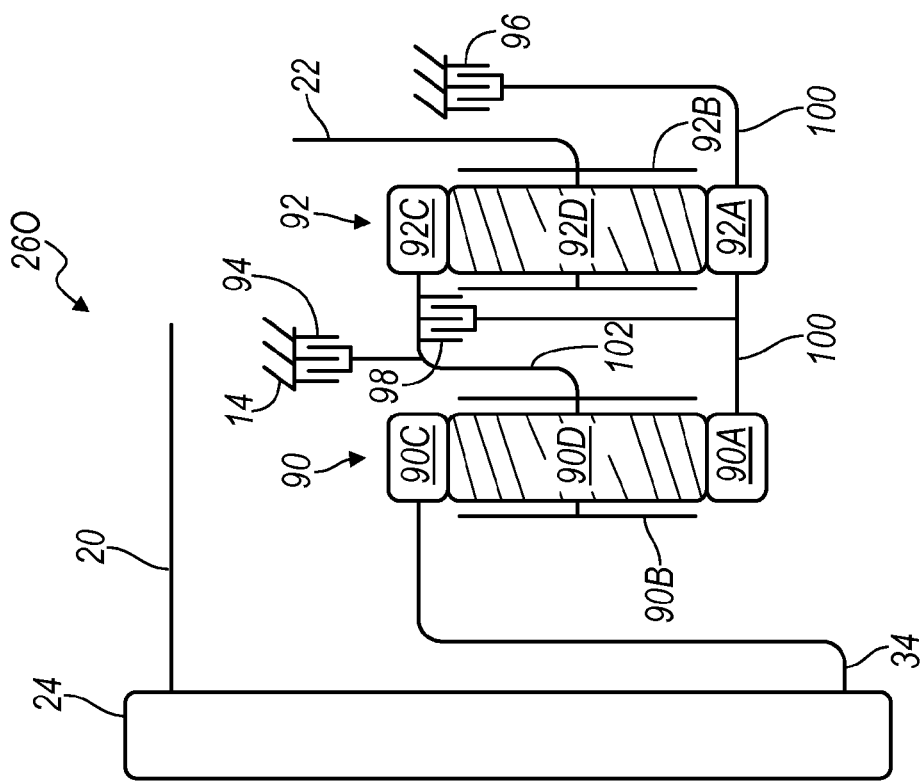
FIG. 9C is a diagrammatic illustration of another embodiment of a transmission according to the principles of the present invention.
Figure 9F:
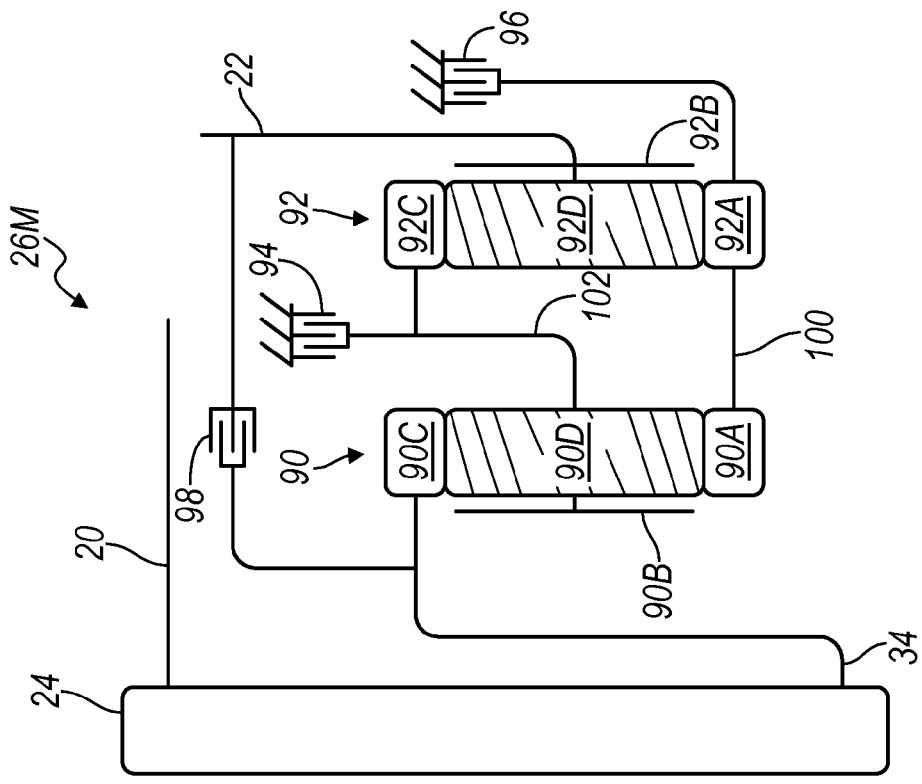
FIG. 9F is a diagrammatic illustration of another embodiment of a transmission according to the principles of the present invention.
Figure 9E:
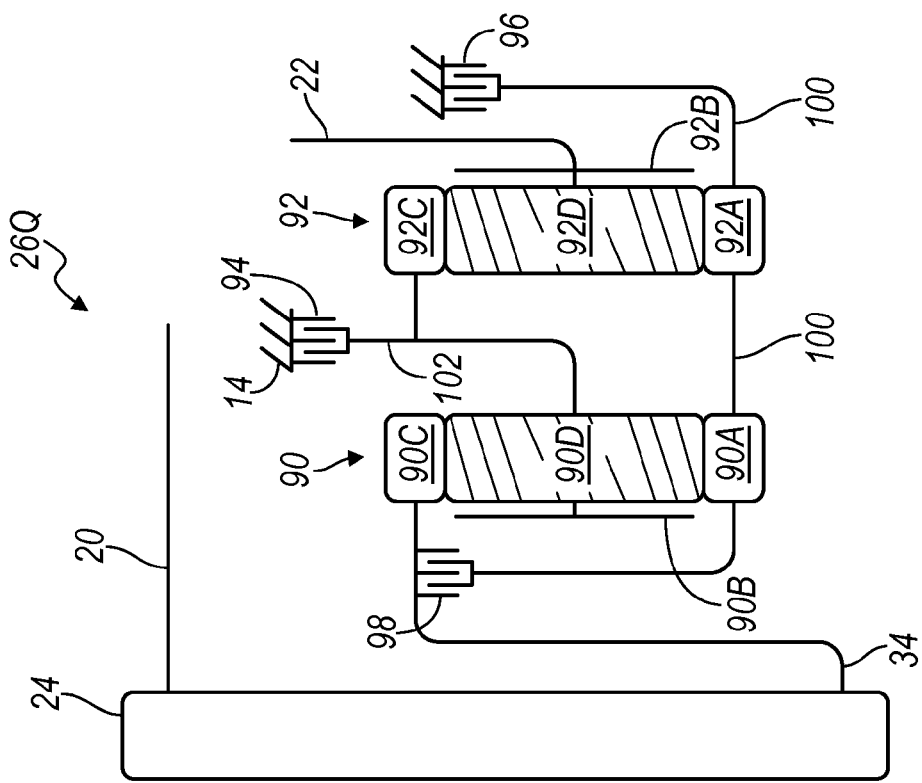
FIG. 9E is a diagrammatic illustration of another embodiment of a transmission according to the principles of the present invention.

The torque-transmitting mechanisms or brakes 94, 96 and clutch 98 allow for selective interconnection of the shafts or interconnecting members, members of the planetary gear sets and the housing. The torque-transmitting mechanisms are friction, dog or synchronizer type mechanisms or the like. For example, the first brake 94 is selectively engageable to connect the second shaft or interconnecting member 102 with the transmission housing 14 in order to restrict relative rotation of the member 102 and therefore the carrier member 90B of the first planetary gear set 90 and the ring gear member 92C of the second planetary gear set 92. The second brake 96 is selectively engageable to connect the first shaft or interconnecting member 100 with the transmission housing 14 in order to restrict relative rotation of the member 100 and therefore the sun gear member 90A and sun gear member 92A. In FIG. 9A, the clutch 98 is selectively engageable to connect the ring gear member 92C and the carrier member 90B with the sun gear member 90A and the sun gear member 92A. Likewise, FIGS. 9B-3F illustrate stick diagrams of the corresponding gearbox arrangements 26M-26R which alter the location of the clutch 98, as described above.

It should be appreciated that where members of planetary gear sets or clutches and brakes are connected for common rotation they are directly connected for common rotation with no intervening torque transmitting devices or planetary gear set members. However, it should be appreciated that individual interconnecting members may be formed of one or more members or integrally formed with members of the planetary gear sets without departing from the scope of the present invention.

The description of the invention is merely exemplary in nature and variations that do not depart from the gist of the invention are intended to be within the scope of the invention. Such variations are not to be regarded as a departure from the spirit and scope of the invention.

The following is claimed:

1. A powertrain for a motor vehicle comprising:
a transmission input member;
a transmission output member;
an intermediate member;
a continuously variable unit having a first pulley pair connected for common rotation with the transmission input member, a second pulley pair connected for common rotation with the intermediate member, and an endless member wrapped around the first pulley pair and the second pulley pair;
a planetary gear arrangement connected to the intermediate member and to the transmission output member;
a plurality of torque transmitting mechanisms interconnected to the planetary gear arrangement;
a chain drive connected for common rotation with the transmission output member;
a transfer member connected for common rotation with the chain drive; and
a final drive planetary gear set connected for common rotation with the transfer member,
wherein selective engagement of the plurality of torque transmitting mechanisms and selective movement of the first pulley and second pulley provides two forward ranges of continuous gear ratios between the transmission input member and the transmission output member.

2. The powertrain of claim 1 wherein the planetary gear arrangement includes a nested planetary gear set having a first member, a second member, a third member, and a fourth member, wherein each of the first, second, third, and fourth members of the nested planetary gear set are coplanar.

3. The powertrain of claim 2 wherein the plurality of torque transmitting mechanisms includes a first brake, a second brake, and a clutch.

4. The powertrain of claim 3 wherein the first member is connected to the second brake, the second member is connected to the first brake, the third member is connected to the intermediate member, and the fourth member is connected to the transmission output member.

5. The powertrain of claim 4 wherein the first member is a sun gear member, the second member is a planet carrier member, the third member is an integrated sun and ring gear member, and the fourth member is a ring gear member.

6. The powertrain of claim 4 wherein the clutch is connected between one of the first, second, third, and fourth members and another of the first, second, third, and fourth members.

7. The powertrain of claim 6 wherein the clutch is connected between the third member and the transmission output member.

8. The powertrain of claim 6 wherein the clutch is connected between the second member and the transmission output member.

9. The powertrain of claim 6 wherein the clutch is connected between the third member and the second member.

10. The powertrain of claim 6 wherein the clutch is connected between the first member and the second member.

11. The powertrain of claim 6 wherein the clutch is connected between the first member and the fourth member.

12. The powertrain of claim 6 wherein the clutch is connected between the first member and the third member.

13. The powertrain of claim 1 wherein the powertrain includes only three axes of rotation from the transmission output member to the final drive planetary gear set.

14. The powertrain of claim 1 wherein the final drive planetary gear set includes a fifth member, a sixth member, and a seventh member, wherein the fifth member is connected for common rotation with the transfer member, the sixth member is interconnected to road wheels of the motor vehicle, and the seventh member is connected to a stationary member.

15. The powertrain of claim 14 wherein the fifth member of the final drive planetary gear set is a sun gear, the sixth member of the final drive planetary gear set is a planet carrier member, and the seventh member of the final drive planetary gear set is a ring gear.

16. A powertrain for a motor vehicle comprising:
a transmission input member;
a transmission output member;
an intermediate member;
a continuously variable unit having a first pulley pair connected for common rotation with the transmission input member, a second pulley pair connected for common rotation with the intermediate member, and an endless member wrapped around the first pulley pair and the second pulley pair;
a nested planetary gear set having a first member, a second member, a third member, and a fourth member, wherein each of the first, second, third, and fourth members of the nested planetary gear set are coplanar, and wherein the third member is connected to the intermediate member and the fourth member is connected to the transmission output member;
a plurality of torque transmitting mechanisms interconnected to the nested planetary gear set;
a chain drive connected for common rotation with the transmission output member;
a transfer member connected for common rotation with the chain drive; and
a final drive planetary gear set connected for common rotation with the transfer member,
wherein selective engagement of the plurality of torque transmitting mechanisms and selective movement of the first pulley and second pulley provides two forward ranges of continuous gear ratios between the transmission input member and the transmission output member.

17. The powertrain of claim 16 wherein the plurality of torque transmitting mechanisms includes a first brake, a second brake, and a clutch, and the first member is connected to the second brake and the second member is connected to the first brake.

18. The powertrain of claim 17 wherein the first member is a sun gear member, the second member is a planet carrier member, the third member is an integrated sun and ring gear member, and the fourth member is a ring gear member.

19. The powertrain of claim 17 wherein the clutch is connected between one of the first, second, third, and fourth members and another of the first, second, third, and fourth members.

20. A powertrain for a motor vehicle comprising:
a transmission input member;
a transmission output member;
an intermediate member;
a continuously variable unit having a first pulley pair connected for common rotation with the transmission input member, a second pulley pair connected for common rotation with the intermediate member, and an endless member wrapped around the first pulley pair and the second pulley pair;
a nested planetary gear set having a sun gear member, a planet carrier member, a combined ring and sun gear member, and a ring gear member, wherein each of the members of the nested planetary gear set are coplanar, and wherein the combined ring and sun gear member is connected to the intermediate member and the ring gear member is connected to the transmission output member;
a first brake connected to the planet carrier member;
a second brake connected to the sun gear member;
a clutch connected between at least two components of the nested planetary gear set;
a chain drive connected for common rotation with the transmission output member;
a transfer member connected for common rotation with the chain drive; and
a final drive planetary gear set connected for common rotation with the transfer member,
wherein selective engagement of the plurality of torque transmitting mechanisms and selective movement of the first pulley and second pulley provides two forward ranges of continuous gear ratios between the transmission input member and the transmission output member.

* * * * *